US008904876B2

(12) United States Patent
Taylor et al.

(10) Patent No.: US 8,904,876 B2
(45) Date of Patent: Dec. 9, 2014

(54) FLEXIBLE PIEZOCAPACITIVE AND PIEZORESISTIVE FORCE AND PRESSURE SENSORS

(71) Applicant: Stryker Corporation, Kalamazoo, MI (US)

(72) Inventors: Geoffrey L. Taylor, Winnipeg (CA); William L. Chapin, Huntington Beach, CA (US)

(73) Assignee: Stryker Corporation, Kalamazoo, MI (US)

( * ) Notice: Subject to any disclaimer, the term of this patent is extended or adjusted under 35 U.S.C. 154(b) by 315 days.

(21) Appl. No.: 13/631,981

(22) Filed: Sep. 29, 2012

(65) Prior Publication Data
US 2014/0090488 A1   Apr. 3, 2014

(51) Int. Cl.
  *G01L 9/06* (2006.01)
  *H01G 7/00* (2006.01)

(52) U.S. Cl.
  USPC .............. 73/727; 73/714; 73/753; 361/283.4

(58) Field of Classification Search
  None
  See application file for complete search history.

(56) References Cited

U.S. PATENT DOCUMENTS

| | | | |
|---|---|---|---|
| 3,818,756 A | 6/1974 | Barron et al. | |
| 3,996,922 A | 12/1976 | Basham | |
| 4,033,332 A | 7/1977 | Hardway, Jr. et al. | |
| 4,267,728 A | 5/1981 | Manley et al. | |
| 4,292,659 A * | 9/1981 | Lao ............................. | 361/283.4 |
| 4,308,872 A | 1/1982 | Watson et al. | |
| 4,388,668 A * | 6/1983 | Bell et al. ................... | 361/283.4 |
| 4,438,771 A | 3/1984 | Friesen et al. | |
| 4,509,527 A | 4/1985 | Fraden | |
| 4,577,510 A * | 3/1986 | Bur et al. ..................... | 73/708 |

(Continued)

FOREIGN PATENT DOCUMENTS

| | | |
|---|---|---|
| EP | 0635251 | 1/1995 |
| GB | 2332063 | 6/1999 |

(Continued)

OTHER PUBLICATIONS

PCT International Search Report regarding Application No. PCT/US2013/062071 filed Sep. 27, 2013, a counterpart of U.S. Appl. No. 13/631,981.

(Continued)

*Primary Examiner* — Lisa Caputo
*Assistant Examiner* — Jermaine Jenkins
(74) *Attorney, Agent, or Firm* — Warner Norcross & Judd LLP

(57) ABSTRACT

Flexible force/pressure sensors for producing electrical output signals proportional to forces or pressures exerted on the sensor include a thin, elastically deformable foam pad laminated between a pair of electrically conducive fabric sheets. A piezocapacitive embodiment of the sensor utilizes an elastically deformable perforated open-cell polyurethane foam pad preferably saturated with glycerin to increase the capacitance of the sensor. The piezocapacitive sensor section is preferably stacked onto a piezoresistive section having a second open-cell foam pad containing piezoresistive carbon particles to form a hybrid piezocapacitive/piezoresistive sensor. A third, "leaky dielectric" embodiment of a sensor includes a single open-cell foam pad which contains both a dielectric liquid and conductive particles. A low frequency such as d.c. to a few hertz is applied to a sensor to determine piezoresistive response of the sensor to forces or pressures and a higher frequency such as 30 KHz is applied to determine piezocapactive response.

36 Claims, 24 Drawing Sheets

(56) References Cited

U.S. PATENT DOCUMENTS

| | | | |
|---|---|---|---|
| RE32,180 E | 6/1986 | Lewiner et al. | |
| 4,633,237 A | 12/1986 | Tucknott et al. | |
| 4,644,801 A | 2/1987 | Kustanovich | |
| 4,657,026 A | 4/1987 | Tagg | |
| 4,738,266 A | 4/1988 | Thatcher | |
| 4,827,763 A | 5/1989 | Bourland et al. | |
| 4,852,443 A * | 8/1989 | Duncan et al. | 84/733 |
| 4,864,463 A * | 9/1989 | Shkedi et al. | 361/283.4 |
| 4,986,277 A | 1/1991 | Sackner | |
| 5,002,060 A | 3/1991 | Nedivi | |
| 5,010,772 A | 4/1991 | Bourland et al. | |
| 5,025,795 A | 6/1991 | Kunig | |
| 5,060,174 A | 10/1991 | Gross | |
| 5,062,169 A | 11/1991 | Kennedy et al. | |
| 5,079,949 A | 1/1992 | Tamori | |
| 5,128,880 A | 7/1992 | White | |
| 5,178,151 A | 1/1993 | Sackner | |
| 5,184,112 A | 2/1993 | Gusakov | |
| 5,209,126 A | 5/1993 | Grahn | |
| 5,253,656 A | 10/1993 | Rincoe et al. | |
| 5,276,432 A | 1/1994 | Travis | |
| 5,448,996 A | 9/1995 | Bellin et al. | |
| 5,471,198 A | 11/1995 | Newham | |
| 5,479,932 A | 1/1996 | Higgins et al. | |
| 5,515,738 A | 5/1996 | Tamori | |
| 5,571,142 A | 11/1996 | Brown et al. | |
| 5,571,973 A | 11/1996 | Taylot | |
| 5,590,650 A | 1/1997 | Genova | |
| 5,600,108 A | 2/1997 | Newham | |
| 5,623,760 A | 4/1997 | Newham | |
| 5,633,627 A | 5/1997 | Newham | |
| 5,640,145 A | 6/1997 | Newham | |
| 5,654,694 A | 8/1997 | Newham | |
| 5,679,902 A * | 10/1997 | Ryhanen | 73/78 |
| 5,684,460 A | 11/1997 | Scanlon | |
| 5,722,287 A | 3/1998 | Forstein | |
| 5,800,360 A | 9/1998 | Kisner et al. | |
| 5,800,480 A | 9/1998 | Augustine et al. | |
| 5,865,755 A | 2/1999 | Golub | |
| 5,964,720 A | 10/1999 | Pelz | |
| 5,967,979 A | 10/1999 | Taylor et al. | |
| 5,993,400 A | 11/1999 | Rincoe et al. | |
| 6,011,477 A | 1/2000 | Teodorescu et al. | |
| 6,025,782 A | 2/2000 | Newham | |
| 6,033,432 A | 3/2000 | Augustine et al. | |
| 6,047,203 A | 4/2000 | Sackner et al. | |
| 6,147,592 A | 11/2000 | Ulrich et al. | |
| 6,155,120 A | 12/2000 | Taylor | |
| 6,180,893 B1 | 1/2001 | Salgo | |
| 6,210,427 B1 | 4/2001 | Augustine et al. | |
| 6,216,545 B1 | 4/2001 | Taylor | |
| 6,279,183 B1 | 8/2001 | Kummer et al. | |
| 6,280,392 B1 | 8/2001 | Yoshimi et al. | |
| 6,297,738 B1 | 10/2001 | Newham | |
| 6,307,168 B1 | 10/2001 | Newham | |
| D451,604 S | 12/2001 | Kasabach et al. | |
| 6,341,504 B1 | 1/2002 | Istook | |
| 6,377,177 B1 | 4/2002 | Broussard et al. | |
| 6,387,542 B1 | 5/2002 | Kozlov et al. | |
| 6,396,004 B2 | 5/2002 | Salgo | |
| 6,413,225 B1 | 7/2002 | Sackner et al. | |
| 6,447,457 B1 | 9/2002 | Forstner et al. | |
| 6,450,957 B1 | 9/2002 | Yoshimi et al. | |
| 6,468,234 B1 | 10/2002 | Van der Loos et al. | |
| 6,478,744 B2 | 11/2002 | Mohler | |
| 6,485,441 B2 | 11/2002 | Woodward | |
| 6,491,647 B1 | 12/2002 | Bridger et al. | |
| 6,493,568 B1 | 12/2002 | Bell et al. | |
| 6,497,720 B1 | 12/2002 | Augustine et al. | |
| 6,498,652 B1 | 12/2002 | Varshneya et al. | |
| 6,524,239 B1 | 2/2003 | Reed et al. | |
| 6,543,299 B2 | 4/2003 | Taylor | |
| 6,546,813 B2 | 4/2003 | Hubbard, Jr. | |
| 6,547,743 B2 | 4/2003 | Brydon | |
| 6,551,251 B2 | 4/2003 | Zuckerwar et al. | |
| 6,551,252 B2 | 4/2003 | Sackner et al. | |
| 6,577,897 B1 | 6/2003 | Shurubura et al. | |
| 6,585,328 B1 | 7/2003 | Oexman et al. | |
| 6,647,289 B2 | 11/2003 | Prutchi | |
| 6,684,418 B2 | 2/2004 | Choi | |
| 6,685,635 B2 | 2/2004 | Shani et al. | |
| 6,698,046 B1 | 3/2004 | Wu | |
| 6,721,980 B1 | 4/2004 | Price et al. | |
| 6,800,502 B2 * | 10/2004 | Sung | 438/40 |
| 6,829,501 B2 | 12/2004 | Nielsen et al. | |
| 6,840,117 B2 | 1/2005 | Hubbard, Jr. | |
| 6,840,907 B1 | 1/2005 | Brydon | |
| 6,853,306 B1 | 2/2005 | Nitschke et al. | |
| 6,921,365 B2 | 7/2005 | Lee | |
| 6,932,774 B2 | 8/2005 | Nakatani et al. | |
| 6,949,869 B2 * | 9/2005 | Junhua et al. | 310/328 |
| 7,001,334 B2 | 2/2006 | Reed et al. | |
| 7,030,764 B2 | 4/2006 | Smith et al. | |
| 7,054,679 B2 | 5/2006 | Hirsh | |
| 7,065,396 B2 | 6/2006 | Hampton | |
| 7,076,371 B2 | 7/2006 | Fu | |
| 7,125,383 B2 | 10/2006 | Hoctor et al. | |
| 7,155,273 B2 | 12/2006 | Taylor | |
| 7,155,281 B1 | 12/2006 | Fayram | |
| 7,173,437 B2 | 2/2007 | Hervieux et al. | |
| 7,201,063 B2 | 4/2007 | Taylor | |
| 7,204,808 B1 | 4/2007 | Friedman et al. | |
| 7,211,053 B2 | 5/2007 | Marmaropoulos et al. | |
| 7,245,956 B2 | 7/2007 | Matthews et al. | |
| 7,282,654 B2 | 10/2007 | Salgo et al. | |
| 7,319,386 B2 | 1/2008 | Collins, Jr. et al. | |
| 7,330,127 B2 | 2/2008 | Price et al. | |
| 7,365,031 B2 | 4/2008 | Swallow et al. | |
| 7,437,787 B2 | 10/2008 | Bhai | |
| 7,459,645 B2 | 12/2008 | Skinner et al. | |
| 7,480,953 B2 | 1/2009 | Romano et al. | |
| 7,500,280 B2 | 3/2009 | Dixon et al. | |
| 7,515,059 B2 | 4/2009 | Price et al. | |
| 7,557,718 B2 | 7/2009 | Petrosenko et al. | |
| 7,568,246 B2 | 8/2009 | Weismiller et al. | |
| 7,631,557 B2 | 12/2009 | DeBeliso et al. | |
| 7,646,294 B2 | 1/2010 | Kow et al. | |
| 7,656,299 B2 | 2/2010 | Gentry et al. | |
| 7,657,956 B2 | 2/2010 | Stacy et al. | |
| 7,699,784 B2 | 4/2010 | Wan Fong et al. | |
| 7,738,155 B2 * | 6/2010 | Agrawal et al. | 359/265 |
| 8,161,826 B1 | 4/2012 | Taylor | |
| 8,162,629 B2 * | 4/2012 | Hirata et al. | 417/413.2 |
| 8,448,530 B2 * | 5/2013 | Leuenberger et al. | 73/862.625 |
| 2001/0042412 A1 | 11/2001 | Serben et al. | |
| 2002/0194934 A1 | 12/2002 | Taylor | |
| 2003/0004423 A1 | 1/2003 | Lavie et al. | |
| 2004/0087865 A1 | 5/2004 | Kelly | |
| 2004/0167418 A1 | 8/2004 | Nguyen et al. | |
| 2004/0186380 A1 | 9/2004 | Kristiansen | |
| 2004/0210155 A1 | 10/2004 | Takemura et al. | |
| 2005/0075542 A1 | 4/2005 | Goldreich | |
| 2005/0101875 A1 | 5/2005 | Semler et al. | |
| 2005/0124864 A1 | 6/2005 | Mack et al. | |
| 2005/0171443 A1 | 8/2005 | Gorenberg et al. | |
| 2005/0190068 A1 | 9/2005 | Gentry et al. | |
| 2005/0241409 A1 | 11/2005 | Taylor | |
| 2005/0245839 A1 | 11/2005 | Stivoric et al. | |
| 2005/0268962 A1 | 12/2005 | Gaudiana et al. | |
| 2006/0028350 A1 | 2/2006 | Bhai | |
| 2006/0065060 A1 | 3/2006 | Ito et al. | |
| 2006/0066449 A1 | 3/2006 | Johnson | |
| 2006/0100530 A1 | 5/2006 | Kliot et al. | |
| 2006/0100534 A1 | 5/2006 | Colombo et al. | |
| 2006/0129047 A1 | 6/2006 | Ruotoistenmaki | |
| 2006/0162464 A1 | 7/2006 | Hayashi et al. | |
| 2006/0173363 A1 | 8/2006 | Felder et al. | |
| 2006/0195035 A1 | 8/2006 | Sun | |
| 2006/0224072 A1 | 10/2006 | Shennib | |
| 2006/0224076 A1 | 10/2006 | Lange et al. | |
| 2006/0241510 A1 | 10/2006 | Halperin et al. | |
| 2006/0258914 A1 | 11/2006 | Derchak et al. | |
| 2006/0260417 A1 | 11/2006 | Son et al. | |
| 2006/0264767 A1 | 11/2006 | Shennib | |

(56) References Cited

U.S. PATENT DOCUMENTS

| | | | |
|---|---|---|---|
| 2007/0083096 A1 | 4/2007 | Paradiso | |
| 2007/0118054 A1 | 5/2007 | Pinhas et al. | |
| 2007/0125181 A1 | 6/2007 | Ofek et al. | |
| 2007/0149883 A1 | 6/2007 | Yesha | |
| 2007/0156031 A1 | 7/2007 | Sullivan et al. | |
| 2008/0200085 A1 | 8/2008 | Van Bruggen et al. | |
| 2008/0229839 A1 | 9/2008 | Chakraborty | |
| 2009/0056020 A1 | 3/2009 | Caminade et al. | |
| 2009/0056027 A1 | 3/2009 | Ball et al. | |
| 2009/0093990 A1 | 4/2009 | McGuire et al. | |
| 2009/0099480 A1 | 4/2009 | Salgo et al. | |
| 2009/0146230 A1* | 6/2009 | Takizawa | 257/419 |
| 2009/0183312 A1 | 7/2009 | Price et al. | |
| 2010/0045454 A1 | 2/2010 | Knight et al. | |
| 2010/0094139 A1 | 4/2010 | Brauers et al. | |
| 2010/0095462 A1 | 4/2010 | Bobey et al. | |
| 2010/0308846 A1 | 12/2010 | Camus | |
| 2011/0068939 A1 | 3/2011 | Lachenbruch | |
| 2012/0055257 A1 | 3/2012 | Shaw-Klein | |
| 2012/0116251 A1 | 5/2012 | Ben-Shalom et al. | |
| 2012/0234105 A1 | 9/2012 | Taylor | |
| 2013/0014810 A1* | 1/2013 | Yamaoka et al. | 136/252 |
| 2013/0091961 A1 | 4/2013 | Taylor | |

FOREIGN PATENT DOCUMENTS

| | | | |
|---|---|---|---|
| JP | 2000000214 | | 1/2000 |
| JP | 2000175904 | A | 6/2000 |
| JP | 20000316915 | A | 11/2000 |
| JP | 2001000401 | A | 1/2001 |
| JP | 2001037821 | A | 2/2001 |
| JP | 2004180804 | | 7/2004 |
| JP | 2005013259 | | 1/2005 |
| JP | 2005204930 | | 8/2005 |
| JP | 2005218604 | | 8/2005 |
| JP | 2008049023 | | 3/2008 |
| WO | 2005000108 | | 1/2005 |
| WO | 2005104904 | | 11/2005 |
| WO | 2009013981 | | 1/2009 |
| WO | 2009120270 | | 10/2009 |
| WO | 2012122002 | | 9/2012 |

OTHER PUBLICATIONS

PCT International Written Opinion regarding Application No. PCT/US2013/062071 filed Sep. 27, 2013, a counterpart of U.S. Appl. No. 13/631,981.

J.C. Barbenal et al., "Monitoring the mobility of patients in bed", Medical and Biological Engineering and Computing, pp. 466-468, Sep. 1985.

Charles F. Babbs, et al., "A Pressure-Sensitive Mat for Measuring Contact Pressure Distributions . . . ", Biomedical Instrumentation and Technology, pp. 363-370, Sep./Oct. 1990.

Makoto Shimojo, et al., A Tactile Sensor Sheet Using Pressure Conductive Rubber With Electrical-Wires Stitched Method, IEEE Sensors Journal, vol. 4, No. 5, Oct. 2004.

Apr. 5, 2010 Webpages from www.swicofil.com/textile_metallization.html.

Laird Technologies. Nick/Copper Polyester Taffeta. Product Specification for 3035-213. <Accessed Online> Sep. 6, 2011. <http://www.stockwell.com/data_sheets/esd_emi/3035213_nickel_polyester_taffeta.pdf>.

Bergen Cable Technology. Cabel 101. <Accessed Online> Sep. 7, 2011. <http://www.bergencable.com/technology/technology_cable101.html>.

* cited by examiner

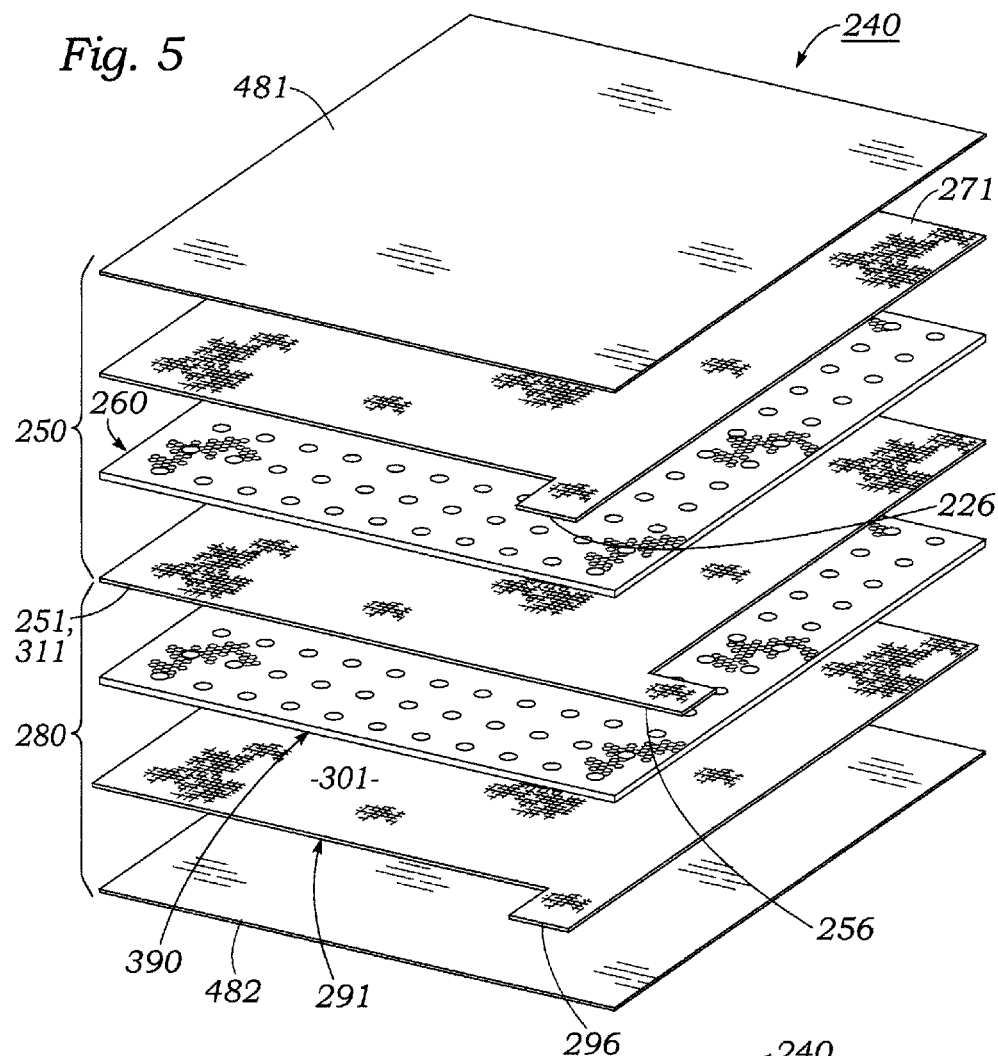
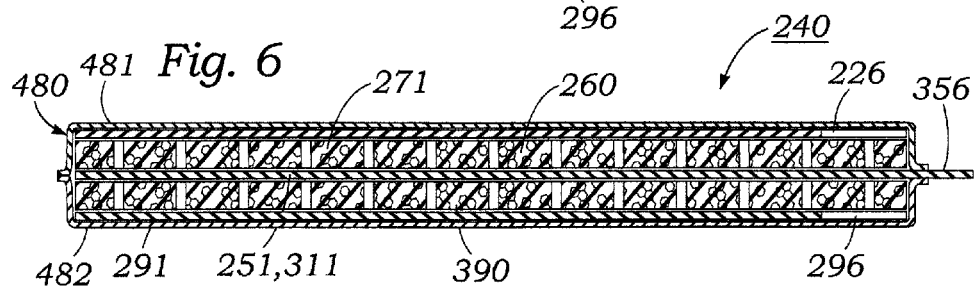

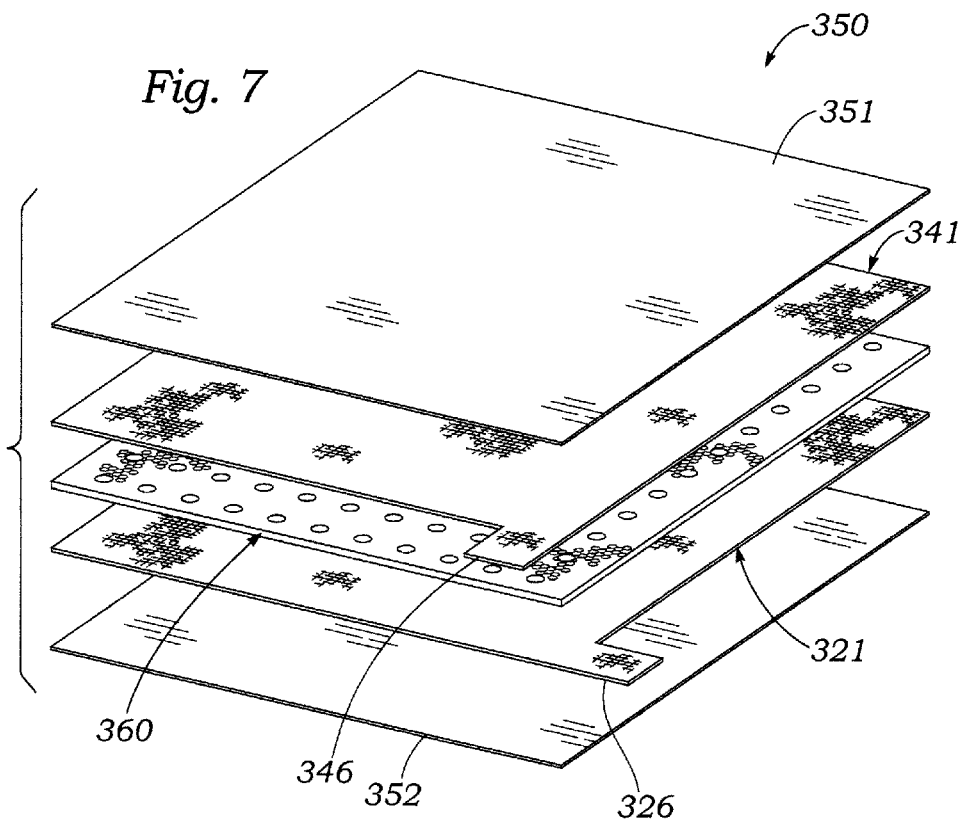
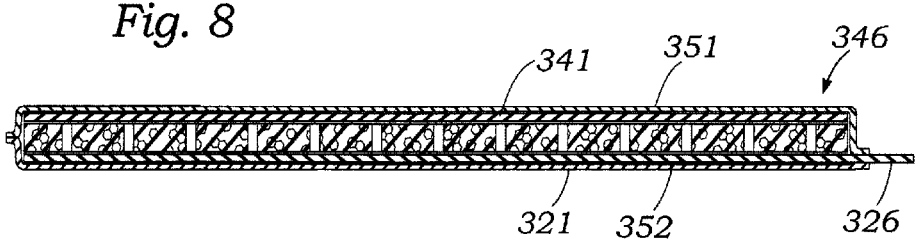

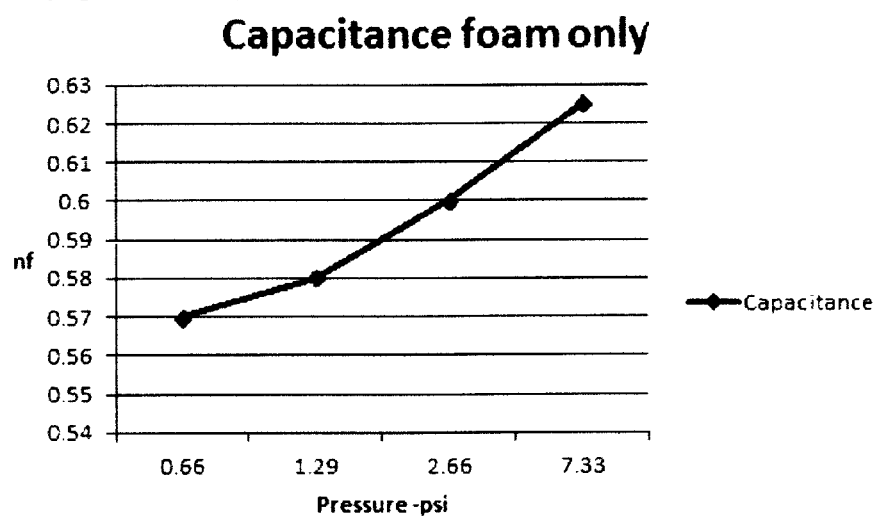
Fig 10A Capacitance vs Pressure Example 1 (Figures 1 & 2)

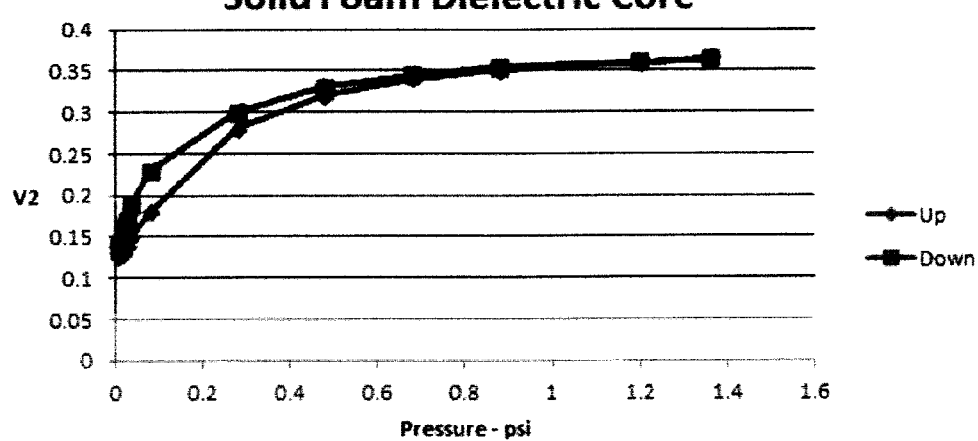

Fig 11A Capacitance vs Pressure of Perforated Foam Sensor Example 2 (Figure 3 & 4) 50% holes in foam core
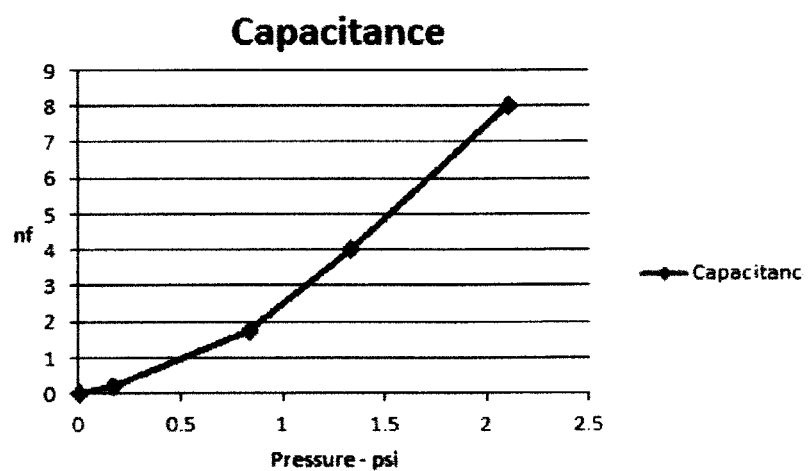

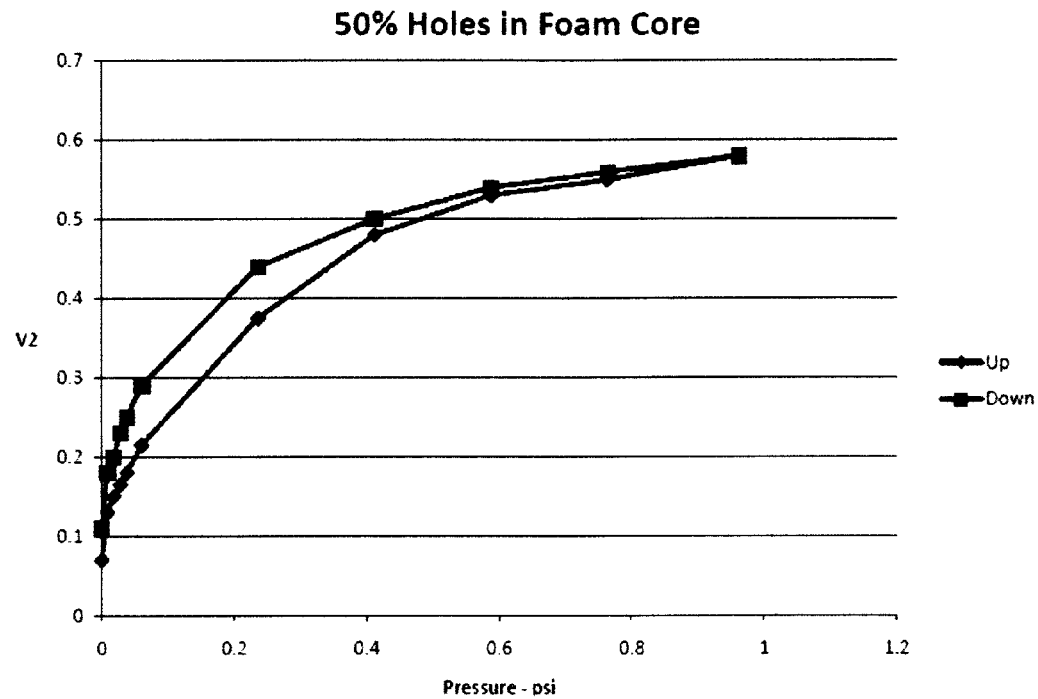

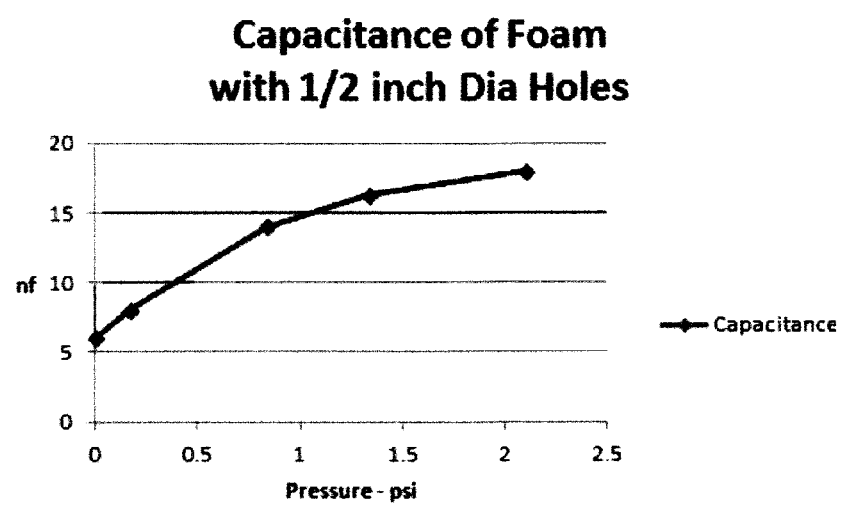
Fig 12 Capacitance vs Pressure of Perforated Foam Sensor Saturated with Glycerin (Example 3, Figures 3 & 4)

Fig 13 Capacitance vs Pressure of Perforated Foam saturated with Glycerin and Iodine (Example 4, Figures 3 & 4)
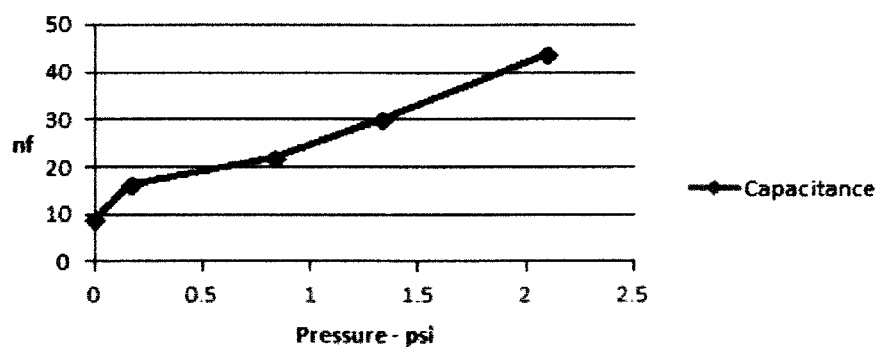

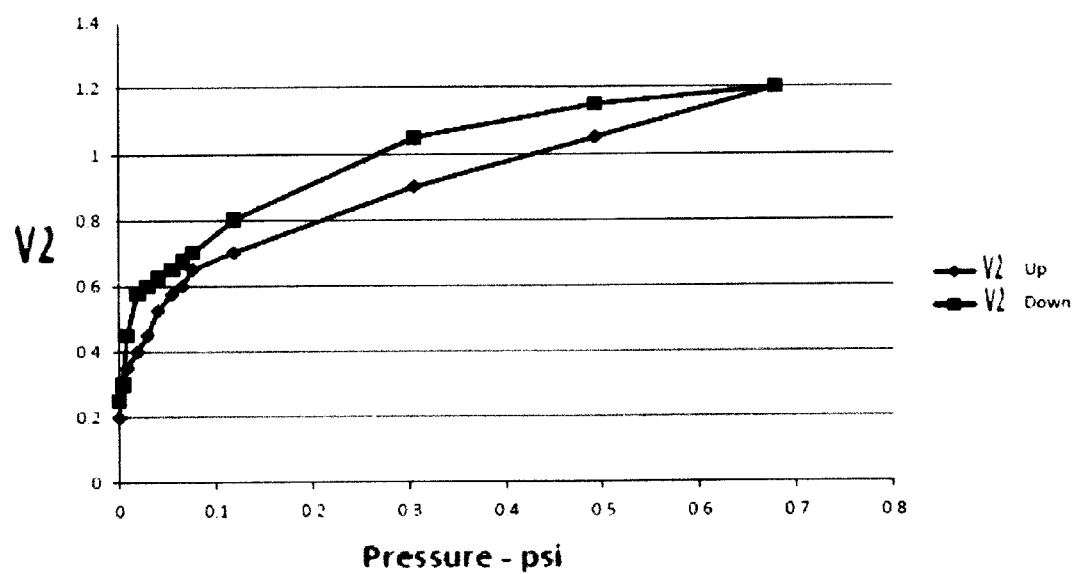

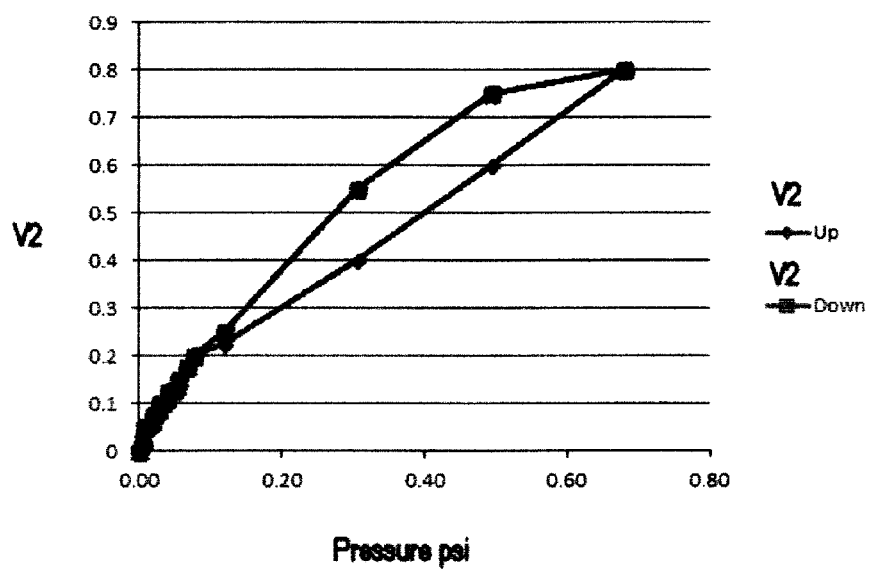
Fig 15. Conductance vs Pressure for Composite or Hybrid Sensor of Example 5 (Figures 5 & 6) Measured @ 10Hz

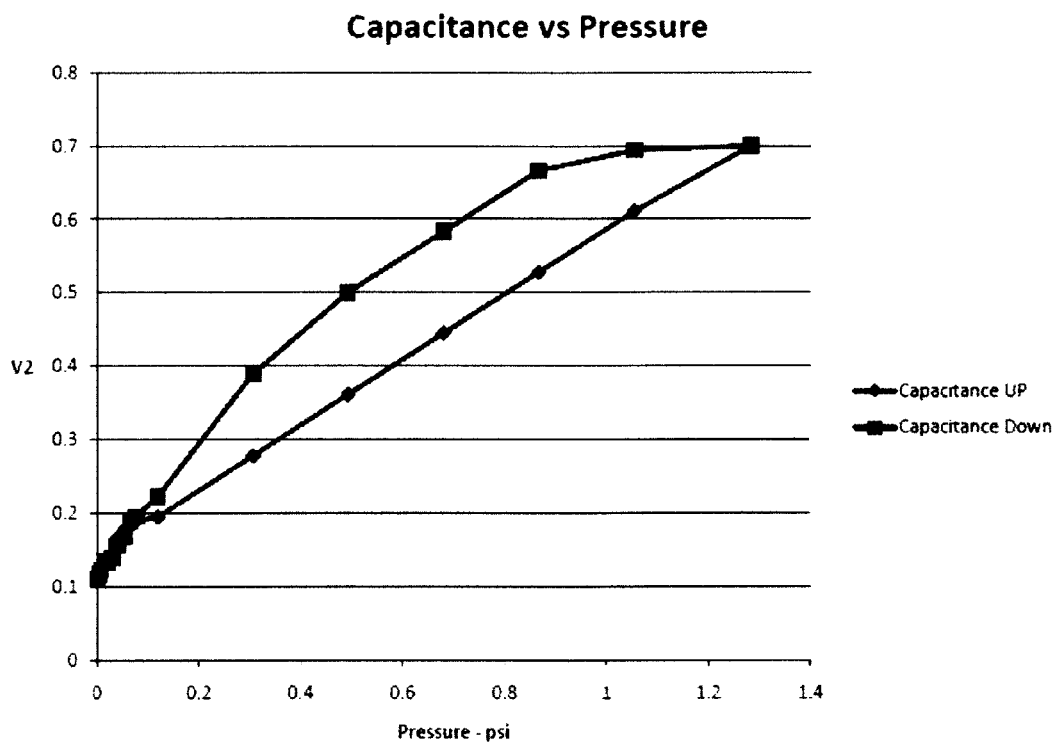
Fig 16 Susceptance vs Pressure of Leaky Dielectric Sensor Example 6 (Figures 7 & 8) measured @ 30KHz

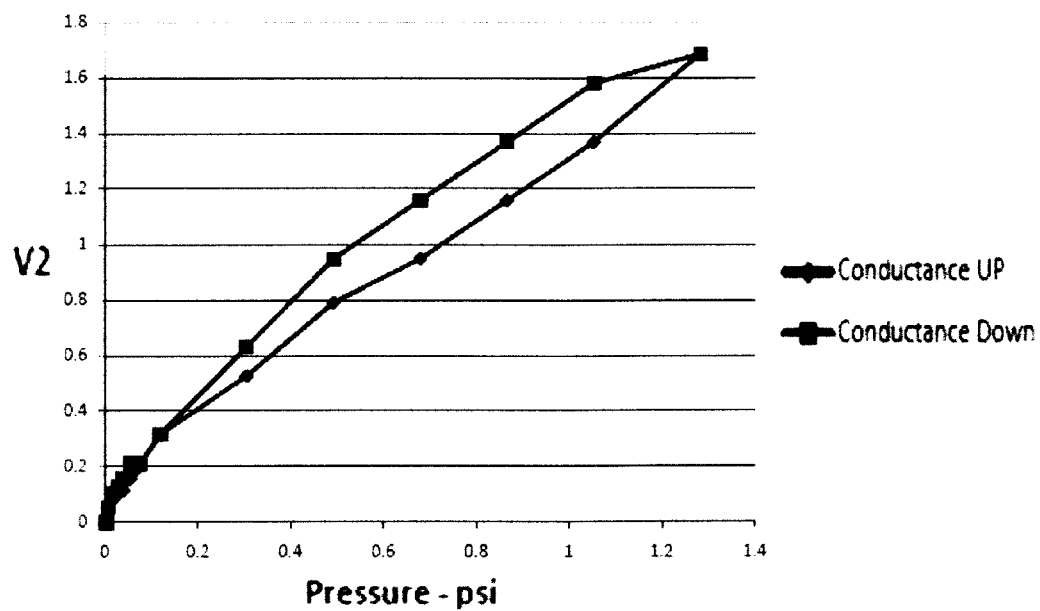
Fig 17 Conductance vs Pressure of Leaky Dielectric Sensor Example 6 (Figures 7 & 8) Measured @ 10Hz

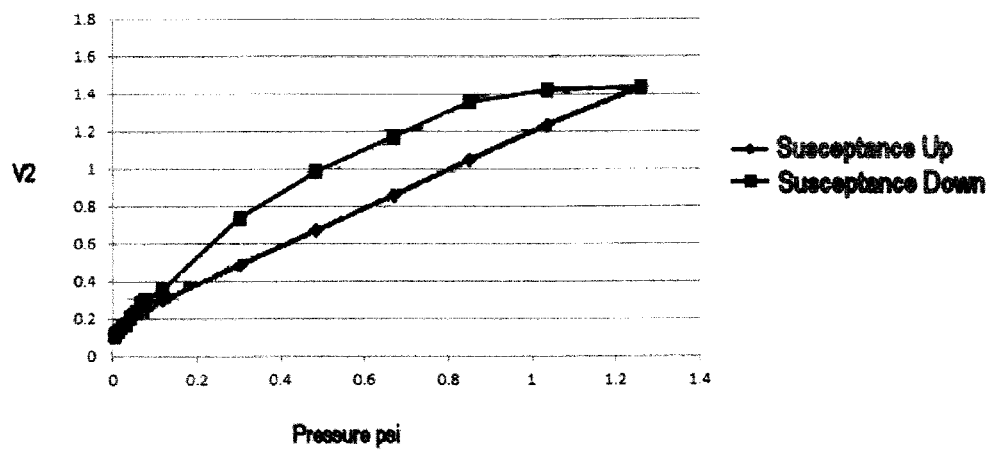
Fig 18 A Susceptance vs Pressure of Leaky Dielectric Sensor Example 6 (Figures 7 & 8)
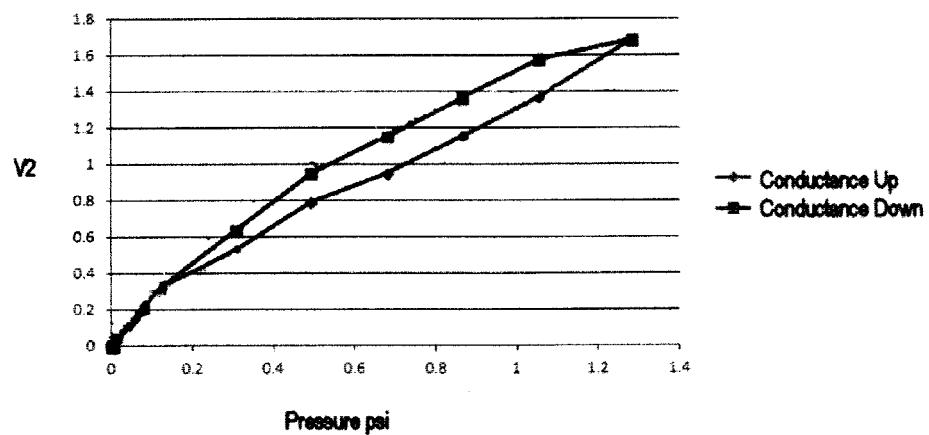
Fig 18 B Conductance vs Pressure of Leaky Dielectric Sensor Example 6 (Figures 7 & 8)

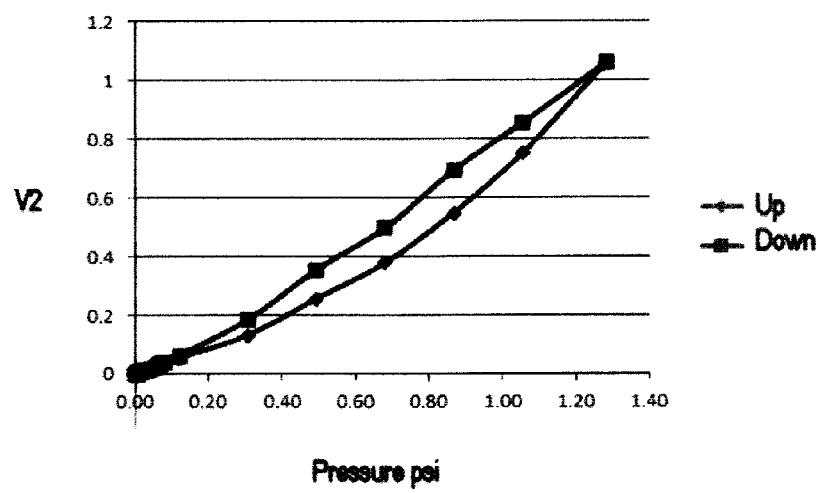
Fig 19 Susceptance times Conductance as a function of pressure of Leaky Dielectric Sensor Example 6 (Figures 7 & 8)

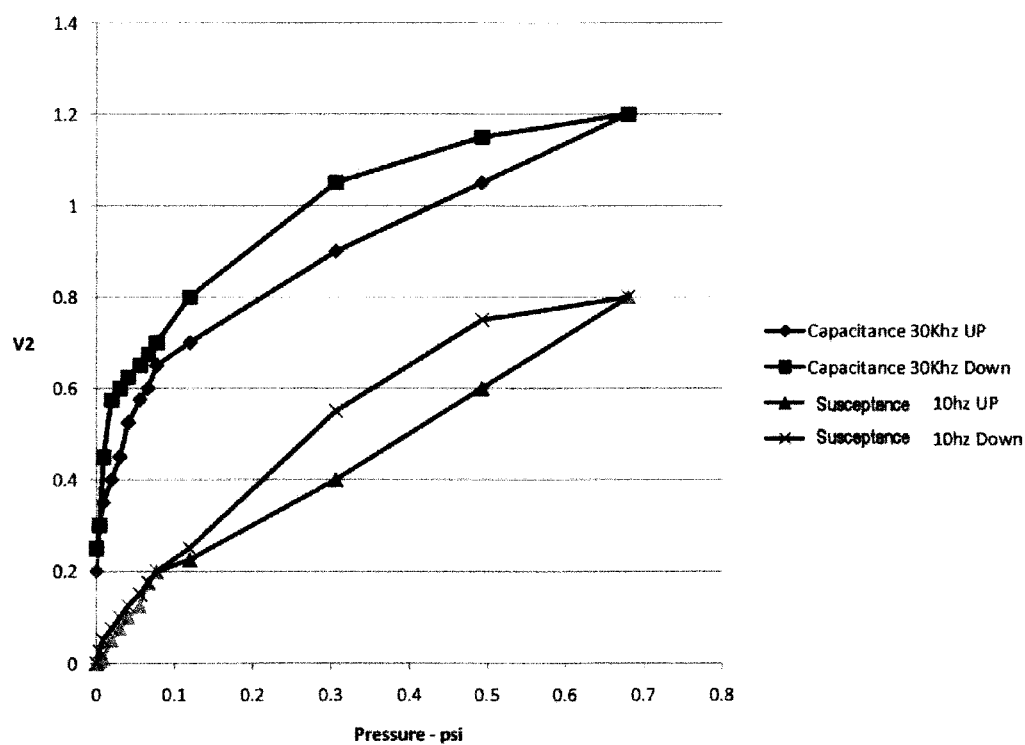

Fig 21  Conductance vs Pressure of Hybrid Sensor
With 10Kohm Resister in Series
Example 8 (Figures 5 & 6)
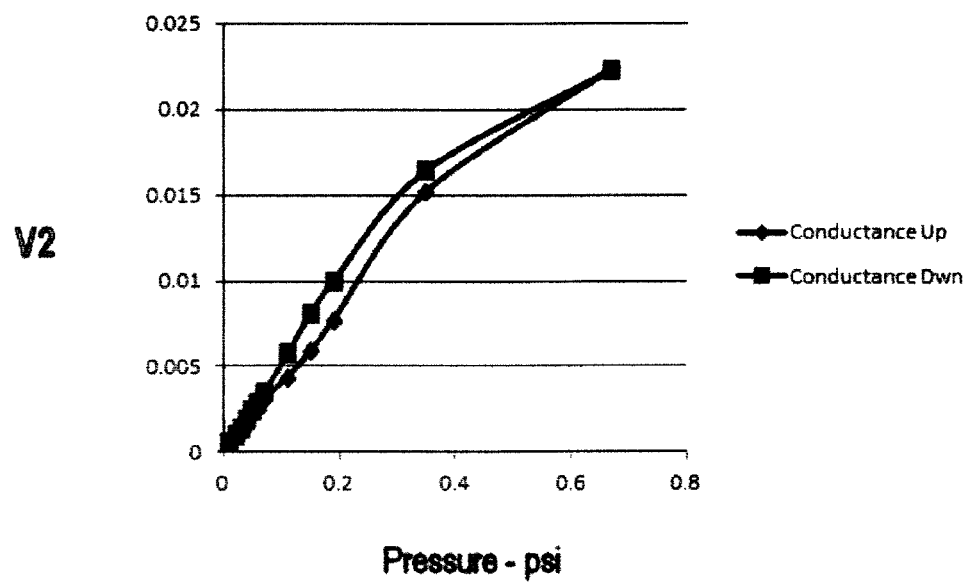

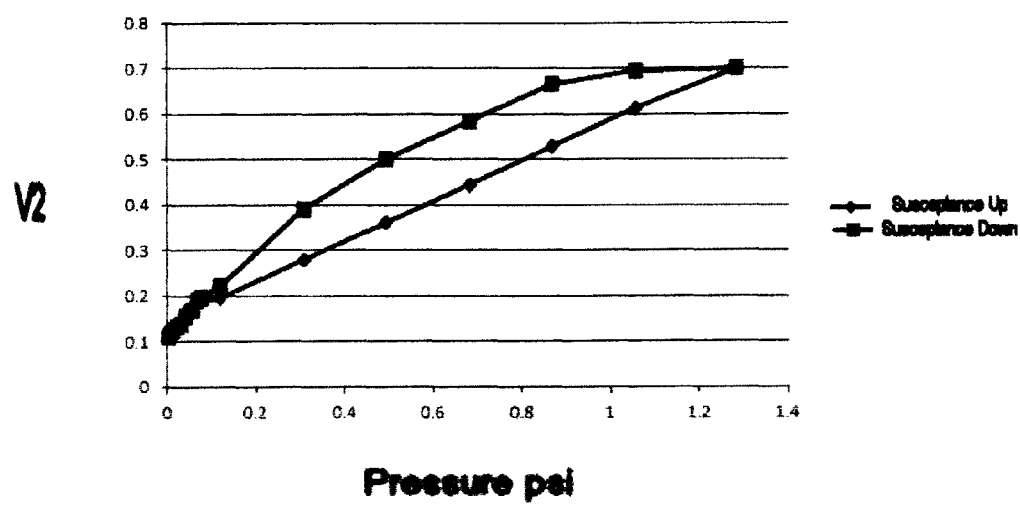
Fig 24  Susceptance of Simplified Leaky Dielectric Sensor
Example 11 (Figures 22 & 23)

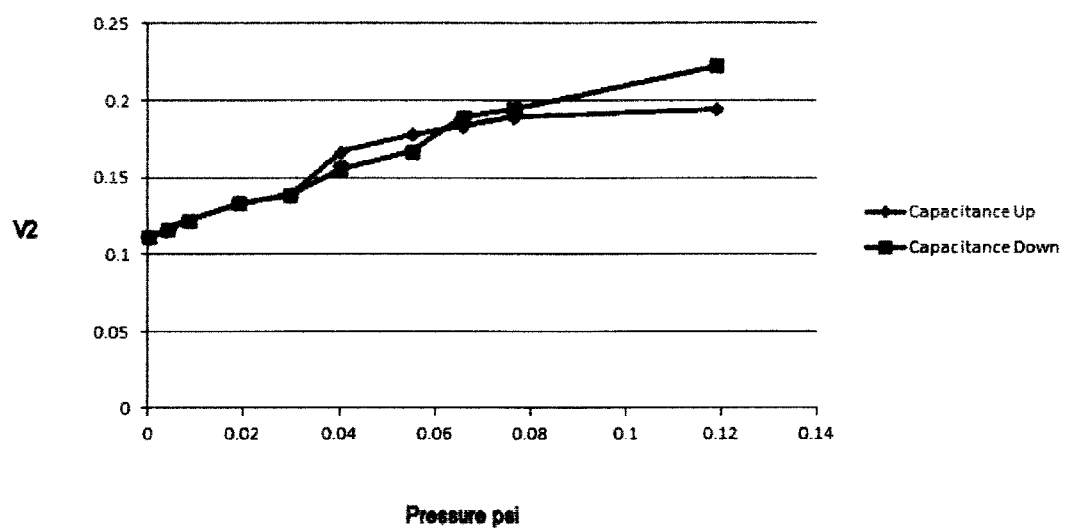

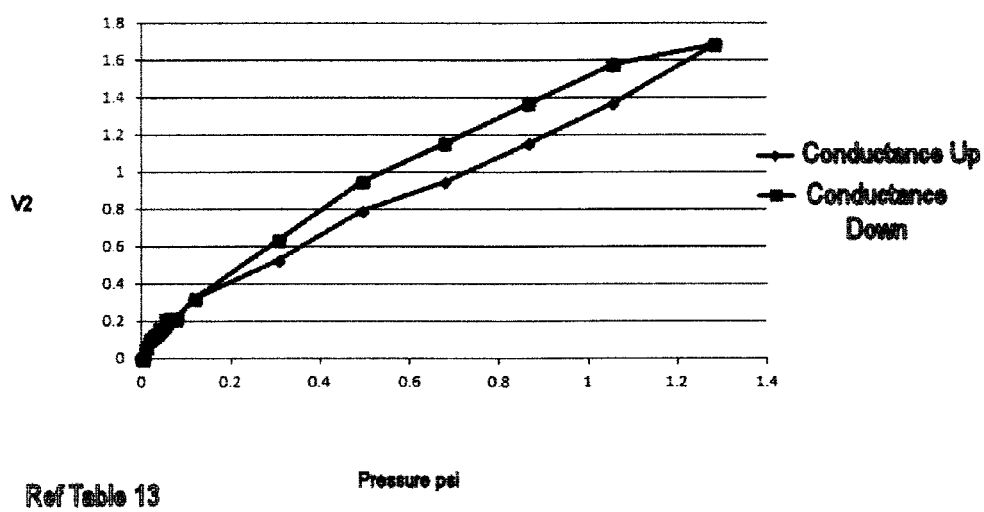
Fig 26 Conductance vs Pressure of Simplified Leaky Dielectric Sensor Example 9 (Figures 22 & 23)
Ref Table 13

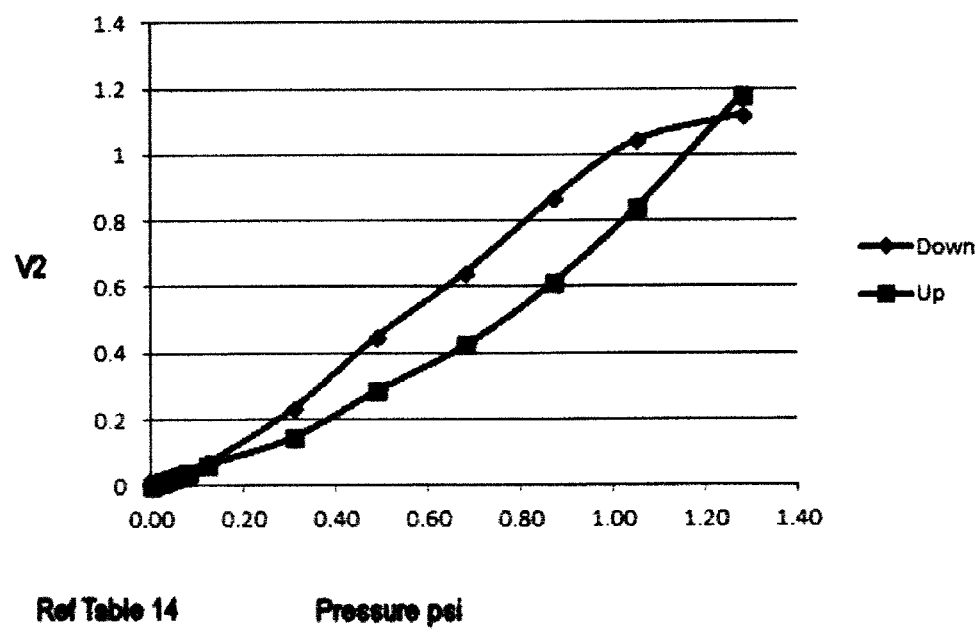
Fig 27 Conductance times susceptance of Simplified Leaky Dielectric Sensor Example 9 Figures 22 & 23)

FLEXIBLE PIEZOCAPACITIVE AND PIEZORESISTIVE FORCE AND PRESSURE SENSORS

BACKGROUND OF THE INVENTION

A. Field of the Invention

The present invention relates to sensors for measuring forces or pressures exerted on a surface. More particularly, the invention relates to novel flexible hybrid force sensors which vary both in resistance and capacitance in response to forces or pressures applied to the sensors, and a pressure measurement apparatus which includes a novel hybrid force/pressure sensor and circuitry for measuring electrical impedances of the sensor at different frequencies.

B. Description of Background Art

There are a wide variety of situations which require the accurate measurement of forces or pressures exerted at various parts of the surface of an object. For example, when a human body is supported by an object such as a chair or bed, normal and shear forces produced in reaction to the weight of an individual are transmitted from the supporting surface through the skin, adipose tissues, muscles, etc. to the skeleton. Forces exerted on body parts by support surfaces, which are equal and opposite to body weight forces, can in some cases cause damage to tissues. This is because forces on body parts can compress internal blood vessels and occlude nutrients from the tissue; the product of the magnitude and duration of these forces determine whether tissue damage or morbidity will occur.

High pressures alone are generally not sufficient to deleteriously affect tissue. Deep-sea divers for example, are subjected to high, but evenly distributed normal forces and do not suffer from tissue damage. If, however, there is a sufficiently large external pressure gradient on a body part, resulting from, for example, a low-pressure area adjacent to a high-pressure area, internal body fluids can migrate to the area of lower pressure.

Tangential or shear forces exerted externally on a body part as a result of uneven normal forces or pressure gradients exerted thereon can also collapse internal capillaries and blood vessels by distorting them along their longitudinal axes. It is therefore extremely important to know both the surface force gradient (pressure gradient) and the externally applied shear force exerted on tissue, because it is the combination of these factors that leads to tissue strain and subsequent tissue death. Thus, even relatively small external shear and normal forces, which may be independent of one another, can combine to produce damagingly large shear stresses on internal tissue. The areas of the human body which are most at risk of developing tissue damage such as a pressure sore are: heel, ischial tuberosities, greater trochanter, occiput and sacrum.

There are available a variety of pressure/force sensors, shear sensors and sensor arrays which are useable for measuring normal and shear forces exerted on human tissues. Such sensors typically consist of a transducer which covers pressure or force variations into electrical signals. For example, the present inventor's U.S. Pat. No. 5,751,973, Nov. 5, 1996, Multi-Directional Piezoresistive Shear And Normal Force Sensors For Hospital Mattresses And Seat Cushions discloses thin, planar sensors for measuring reaction forces exerted by mattresses or chair pads on the body of a recumbent or seated patient. One embodiment of the invention disclosed in the specification of the '973 patent includes a sensor comprised of a two-dimensional array of isolated sensor element pads, each consisting of a thin, flat layer formed of a non-conductive elastomeric polymer matrix filled with electrically conductive particles. A matrix of upper and lower conductive elements in electrical contact with upper and lower sides of each sensor pad enables separate measurements to be made of the electrical resistance of each pad. Pressure exerted on each pad, e.g., in response to a normal force exerted on the sensor matrix by a person's body, reduces the thickness of the sensor pad, and therefore its electrical resistance by a bulk or volume piezoresistive effect.

The present inventor also disclosed a novel method and apparatus for measuring pressures exerted on human feet or horses' hooves in U.S. Pat. No. 6,216,545, Apr. 17, 2001, Piezoresistive Foot Pressure Measurement. The novel apparatus disclosed in the "545 patent includes a rectangular array of piezoresistive force sensor elements encapsulated in a thin, flexible polymer envelope. Each sensor element includes a polymer fabric mesh impregnated with conductive particles suspended in an elastomeric matrix such as silicone rubber. The piezoresistive mesh layer is sandwiched between an array of row and a column conductor strip laminations, preferably made of a nylon mesh impregnated with printed metallic paths. Each region of piezoresistive material sandwiched between a row conductor and column conductor comprises an individually addressable normal force or pressure sensor in a rectangular array of sensors, the resistance of which varies inversely in a pre-determined way as a function of pressure exerted on the sensors, and thus enabling the force or pressure distribution exerted by an object contacting the array to be mapped.

In U.S. Pat. No. 6,543,299, Apr. 8, 2003, Pressure Measurement Sensor With Piezoresistive Thread Lattice, the present inventor disclosed a transducer sensor array for measuring forces or pressures exerted on a surface, the array including a fabric-like, two-dimensional lattice of individual force or pressure sensor transducer elements comprising intersecting regions of pairs of elongated, flexible threads, each consisting of a central electrically conductive wire core covered by a layer of piezoresistive material which has an electrical resistivity that varies inversely with pressure exerted on the material.

In U.S. Pat. No. 7,201,063, Apr. 10, 2007, Normal Force Gradient/Shear Force Sensors And Method Of Measuring Internal Biological Tissue Stress, the present inventor disclosed a normal force gradient/shear force sensor device and measurement method for measuring internal stresses in tissues of a person supported by a chair or bed. The device includes a planar matrix array of peripheral normal force sensors radially spaced from central shear force sensors, each including an electrically conductive disk located within a circular opening bordered by circumferentially spaced apart peripheral electrodes. The disk and peripheral electrodes are located between upper and lower cover sheets made of a stretchable material such as polyurethane, one cover sheet being adhered to the disk and the other sheet being adhered to a support sheet for the electrodes. Motion between the cover sheets in response to shear forces exerted on the array causes the disk to press more or less tightly against the peripheral electrodes, thus varying electrical conductance between the disk and electrodes proportionally to the magnitude and direction of the shear force. Each normal force sensor includes an electrically conductive film pressed between row and column conductors. Measurements of conductance values of pairs of sensors, which vary proportionally to normal forces exerted on the sensor, are used to calculate gradient vectors of normal forces exerted by a body part on the sensor array, which is combined with the shear force vectors in an algorithm to calculate internal reaction shear forces, e.g., on flesh near a bony prominence.

In co-pending U.S. patent application Ser. No. 12/075,937, filed Mar. 15, 2008, the present inventor disclosed an Adaptive Cushion Method And Apparatus For Minimizing Force Concentrations On A Human Body. That apparatus included an adaptive cushion for placement on a mattress or chair, the cushion having a matrix of air bladder cells which are individually pressurizable to variable pressures by means of an air compressor and valves. The apparatus disclosed in that application also included a flexible, stretchable planar array of force sensor transducers of novel construction, which is preferably positioned on the upper surface of the cushion, the array having at least one sensor in vertical alignment with each air bladder cell of the cushion.

The sensor array disclosed in the above-cited patent application included stretchable fabric row and column conductors which have sandwiched between inner facing conductive surfaces thereof a stretchable fabric sheet coated with a piezoresistive material. Thus constructed, the planar sensor array is elastically deformable in response to forces exerted on the array by the weight of a human body supported on the upper surface of the sensor array overlying the air bladder cells. Preferably, the sensor array is placed on the upper surfaces of the air bladder cells and maintained in that position by a form-fitting, waterproof, contour sheet. The fabric matrices for both row and column conductors, as well as the central piezoresistive layer, are all made of a material which is elastically deformable in any direction within the plane of the material. In a preferred embodiment, the fabric matrices or the row conductor sheet and column conductor sheet are plated with a copper base coat and nickle cover coat. The central piezoresistive sheet consists of a synthetic fabric matrix coated with piezoresistive coating. The sensor array also has an upper cover sheet which is made of a fabric such as Lycra which has a two-way stretch characteristic, i.e., is elastically stretchable in orthogonal directions.

To avoid cross-talk between measurements of the resistance of individual sensors in the array, by which measurements forces exerted on the sensors are determined, the sensors were constructed in a novel way which gave them non-bilateral, asymmetric current-versus-voltage impedance characteristics. Asymmetric impedance was produced by modifying the sensors to have a diode-like characteristic, by altering either the upper or lower surface of the central piezoresistive sheet to form thereon a P-N, semiconductor-type junction, by a novel method described in detail in the disclosure of that application.

The flexible force sensor arrays described above have proven highly effective in performing their intended functions. However, there were situations in which it would be desirable to have available force sensor arrays with somewhat different characteristics not offered by prior sensor arrays.

For example, if typical previously existing flexible sensor arrays are used to measure pressures exerted on a human body by a very form-fitting, conformal wheelchair seat cushion or extremely low pressure bed mattress or cushion, such sensor arrays often interfere with the function of the cushion or bed support surface, and give erroneous force measurements which are used to map the way the bed or chair supports a person. Such errors result from a "hammocking" effect, in which a flexible but not drapable sensor array deployed between fixed support positions cannot conform precisely to the shape of a patient. This effect can occur for example, using sensor arrays that use wire core sensing elements which make the arrays essentially non-stretchable. The lack of conformability of a sensor array alters the way a cushion or bed supports a patient, and also frequently results in forces or pressures exerted on individual sensors in the array being larger than a patient would actually encounter in the absence of the sensor array.

Another situation in which previous force sensor arrays for measuring and mapping forces exerted on human body parts are less than satisfactory occurs when attempting to make such measurements in a non-obtrusive, non-interfering manner on body parts which have complex shapes such as the feet.

For example, people who have diabetes often lose feeling sensation in their feet. Since they cannot feel when an ill-fitting shoe is exerting excessive pressure on parts of the foot, the pressure spots can lead to ulcers, which may in turn necessitate amputation of the foot. Accordingly, to prevent such undesirable results, it would be desirable to have a sensor array which could be used to identify such problems, so that corrective actions such as changing the size or shape of a shoe may be taken in a timely manner.

To address the problem of measuring and mapping forces exerted on complex shapes having compound curves, such as a human foot, the present inventor disclosed in co-pending application Ser. No. 12/380,845 force or pressure sensor arrays which have elastically stretchable electrically conductive polymer threads disposed in parallel rows and columns that contact at intersections thereof a piezoresistive material which has an electrical resistivity which varies inversely with pressure or force exerted thereon to form a matrix array of force or pressure sensor elements. The threads are fixed to a single one or pair of flexible elastically stretchable substrate sheets made of thin sheets of an insulating polymer such as PVC, or for greater elasticity and conformability to irregularly-shaped objects such as human body parts, an elastically stretchable fabric such as LYCRA or SPANDEX. Elastic stretchability of the sensor arrays is optionally enhanced by disposing either or both row and column conductive threads in sinuously curved, serpentine paths rather than straight lines.

The present invention was conceived of to provide highly flexible force/pressure sensors which have a wide dynamic range. At least partially in response to the unavailability of present sensor arrays to fulfill the requirements described above.

OBJECTS OF THE INVENTION

An object of the present invention is to provide thin, flexible force or pressure sensors which are conformable to objects having complex, compoundly curved shapes such as human body parts, to facilitate measuring and mapping forces or pressures exerted on such objects, and which have a wide dynamic range.

Another object of the invention is to provide thin, flexible pressure or force sensors which consist of transducers that vary in capacitance and/or electrical conductance in a predetermined way as a function of external normal forces or pressures exerted on the sensors.

Another object of the invention is to provide an apparatus for measuring forces or pressures which includes in combination a sensor which varies both capacitance and conductance as a function of applied force or pressure, and circuitry for measuring the impedance of the sensor at two different discrete frequencies to obtain separate measurements of capacitive and conductive components of the sensor impedance.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of my exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends small thin, flexible force or pressure sensing sensors or transducers which are useable to measure normal forces or pressures exerted on individual areas of an object such as a human body supported by a bed or chair. Novel force or pressure sensors according to the present invention have a novel design and construction in which the electrical capacitance of the sensor varies in a repeatable fashion as function of normal force or pressure applied to the sensor, a property which may be referred to as piezocapacitance. This property enables the sensor to measure force or pressure exerted on the sensor by applying an alternating voltage or current to terminals of the sensor and measuring the output current or voltage of the sensor, which varies with force or pressure according to a transfer function that has been previously obtained for the sensor by a calibration procedure in which the impedance of the sensor is measured and recorded for a sequence of known calibrating forces or pressures applied to the sensor.

Individual sensors, according to the present invention are readily configurable into a planar array of individual sensors, which facilitates obtaining a pressure or force map that may be used to quantify distribution of pressures or forces exerted on a human body by a supporting bed or chair.

Preferred embodiments of force or pressure sensing transducers or sensors according to the present invention have a novel hybrid construction which includes a piezoresistive characteristic, thus resulting in a sensor in which both the d.c conductance as well as the electrical capacitance vary as a function of applied normal force or pressures. The combined variation of conductance and capacitance affords increased versatility to the hybrid sensors, including wider dynamic ranges.

A basic embodiment of a piezocapacitive pressure sensor according to the present invention has a flat laminated structure which includes a base electrode consisting of a thin, flexible electrically conductive fabric or film sheet, a thin, flexible dielectric layer conformally overlying the base electrode lamination, and a thin, flexible electrically conductive fabric or film sheet upper, outer or cover electrode lamination which overlies the upper surface of the dielectric layer.

The upper and lower electrically conductive sheets of the piezocapacitance sensor each consist of a thin, flexible sheet of conductive fabric such as a fabric woven from silver plated nylon threads. The dielectric layer of the sensor consists of a thin sheet, e.g., 0.010 inch thick, of an elastically deformable, open-cell polyurethane foam. In preferred embodiments of flexible piezocapacitive sensors according to the present invention, active elements of the sensor including upper and lower conductive sheets with a dielectric layer sandwiched between them are protected from external environmental influences such as humidity by being encapsulated in a flat envelope. The encapsulating envelope consists of thin upper and lower rectangular-shaped cover sheets made of a liquid and air impervious material such as polyurethane film, the peripheral edges of which are sealed together by suitable means such as adhesive or thermal bonding. Electrical connections are made to the upper and lower electrode laminations by means of rectangular tabs which are continuous with the upper and lower conductive sheets, and which extend outwards of the peripheral seals between the upper and lower cover sheets.

In preferred embodiments of piezocapacitive force sensors according to the present invention, the dielectric foam core contains a regular array of multiple, laterally spaced apart circular perforations which have total area of about 50 percent of the area of the core, and the core is saturated with a liquid dielectric such as glycerin.

Preferred embodiments of hybrid sensors according to the present invention include a thin, flat laminated piezoresistive section which is located below or above the piezocapacitive section. The piezoresistive section is similar in construction to the piezocapacitive section, with the exception that the foam layer of the piezoresistive section is impregnated with a piezoresistive substance such as carbon black.

In a preferred, "leaky dielectric" variation of a hybrid force sensor according to the present invention, a single active center layer is provided which consists of a foam pad saturated with a dielectric liquid such as glycerin which holds in suspension a piezoresistive substance such as carbon black.

According to the invention, the capacitance and conductance of the sensors are both proportional to external normal forces or pressures exerted on the sensors. Therefore, the magnitude of external forces or pressures exerted on the sensors can be accurately determined by measuring the conductance of a sensor using an applied d.c. voltage or a low frequency alternating current test signal having a frequency of, for example, 1 Hz to 30 Hz, while the capacitance of a sensor can be measured by applying a higher frequency alternating current test voltage or current of, for example, 30 KHz. Moreover, combinations of d.c. or lower frequency test voltages or currents may be applied to a sensor simultaneously or sequentially with higher frequency test voltages or currents to determine force or pressure exerted on the sensor.

Optionally, a fixed value of resistance may be actually or computationally inserted in series with a sensor according to the present invention. Adding such a series resistance has been found to be effective in reducing hysterisis and increasing linearly of the sensor response.

Also, it has been found that linearity can be increased and hysterisis reduced by multiplying resistive and capacitive transfer functions of a sensor, with or without a series resistance.

The present inventors have also found that providing a hybrid sensor which varies both in capacitance and conductance in response to external forces or pressures exerted on the sensor affords significant advantages over sensors which vary only in capacitance or conductance. Specifically, it has been found by the present inventors that in sensors according to the present invention, response time to pressure impulses and linear dynamic range regions, among other parameters, vary differently for the conductive and capacitive sections of the hybrid sensors. These variations enable adaptive optimization of sensor accuracy, repeatability, and response time by judicious choices of combinations of the frequencies of voltages or currents used to sample the sensors.

BRIEF DESCRIPTION OF THE DRAWINGS

FIG. 5 is an exploded perspective view of another modification of the sensor of FIGS. 1 and 2, consisting of a basic embodiment of a hybrid piezocapacitive, piezoresistive force sensor according to the present invention.

FIG. 6 is a vertical sectional view of the hybrid sensor of FIG. 5.

FIG. 7 is an exploded perspective view of a leaky dielectric embodiment of a hybrid piezocapactive-piezoresistive sensor according to the present invention, which has a single layer foam dielectric pad that has both piezocapacitive and piezoresistive properties FIG. 8 is a vertical sectional view of the sensor of FIG. 7

FIG. 10A is a graph showing capacitance versus applied pressure for the basic embodiment of the piezocapacitive sensor shown in FIGS. 1 and 2.

FIG. 10B is a graph showing capacitance of the basic embodiment of the piezocapacitive sensor shown in FIGS. 1 and 2 plotted as a function of increasing and decreasing normal force/pressure applied to the sensor, using the test circuitry shown in FIG. 9.

FIG. 11A is a graph showing capacitance versus normal force/pressure for the second embodiment of the sensor shown in FIGS. 3 and 4.

FIG. 11B is a graph showing capacitance versus increasing and decreasing pressures for the sensor of FIGS. 3 and 4, using the test circuitry shown in FIG. 9.

FIG. 12 is a graph showing capacitance versus normal force/pressure for a first variation of the sensor of FIGS. 3 and 4, filled with glycerin.

FIG. 13 is a graph showing capacitance versus normal force/pressure for a second variation of the sensor of FIGS. 3 and 4, filled with glycerin and iodine.

FIG. 14 is a graph showing capacitance versus normal force/pressure for the hybrid sensor of FIGS. 5 and 6.

FIG. 15 is a graph showing conductance versus applied normal force/pressure for the hybrid sensor of FIGS. 5 and 6.

FIG. 16 is a graph showing capacitance versus normal force/pressure for the leaky dielectric sensor of FIGS. 7 and 8.

FIG. 17 is a graph showing conductance versus normal force/pressure for the leaky dielectric sensor of FIGS. 7 and 8.

FIG. 18A is a graph showing capacitance plotted as a function of applied normal pressure for the leaky dielectric sensor of FIGS. 7 and 8.

FIG. 18B is a graph showing conductance plotted as a function of applied normal pressure for the leaky dielectric sensor of FIGS. 7 and 8.

FIG. 19 is a variation of FIG. 18, in which the product of conductance and capacitance for the leaky dielectric sensor of FIGS. 7 and 8 is plotted.

FIG. 20 is a graph showing a plot of capacitance versus applied normal force/pressure for another modified configuration of the hybrid sensor of FIGS. 5 and 6, in which the piezoresistive and piezocapacitive layers are connected in parallel to configure the sensor as a two-terminal device, measured at 30 KHz, and a plot showing conductance versus pressure for the hybrid sensor of FIGS. 5 and 6 configured as a two-terminal device, measured at 3 Hz.

FIG. 21 is a graph similar to that of FIG. 20, but with the sensors of FIGS. 5 and 6 modified by insertion of a 10,000 ohm resistor in series with the piezoresistive layer of the sensor.

FIG. 24 is a graph showing capacitance versus pressure for the sensor of FIGS. 22 and 23, measured at 30 KHz.

FIG. 25 is an expanded scale version of FIG. 24 showing capacitance versus pressure on sensor 450 for a smaller range of pressures.

FIG. 26 is a plot of conductance versus increasing and decreasing pressure on the simplified leaky sensor 450.

FIG. 27 is a plot of the product of conductance times capacitance versus increasing and decreasing pressures on the simplified leaky sensor 450.

DESCRIPTION OF THE PREFERRED EMBODIMENTS

Example 1

Figure 1:
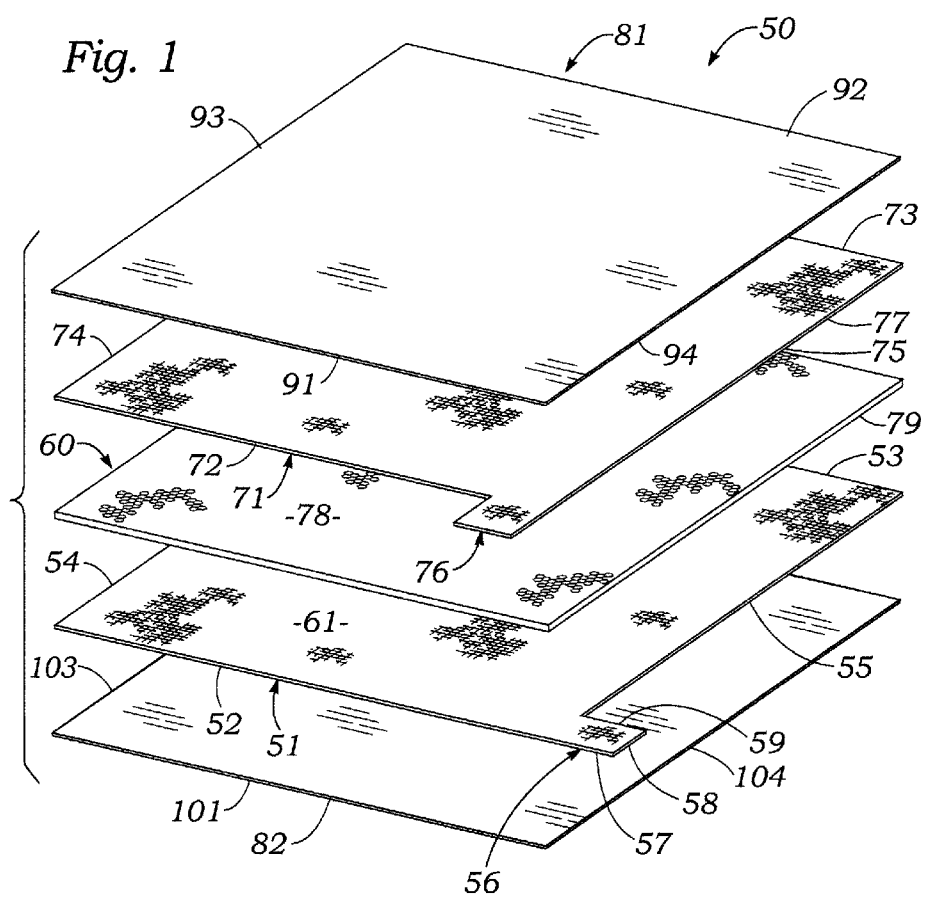
FIG. 1 is an exploded perspective view of a basic embodiment of a, piezocapacitive force sensor according to the present invention.
Figure 2:
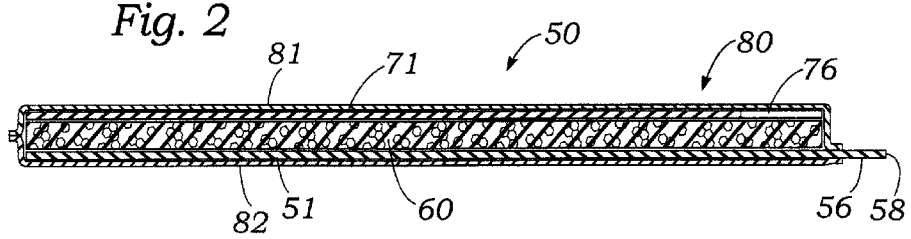
FIG. 2 is a vertical sectional view of the sensor of FIG. 1.
Figure 3:
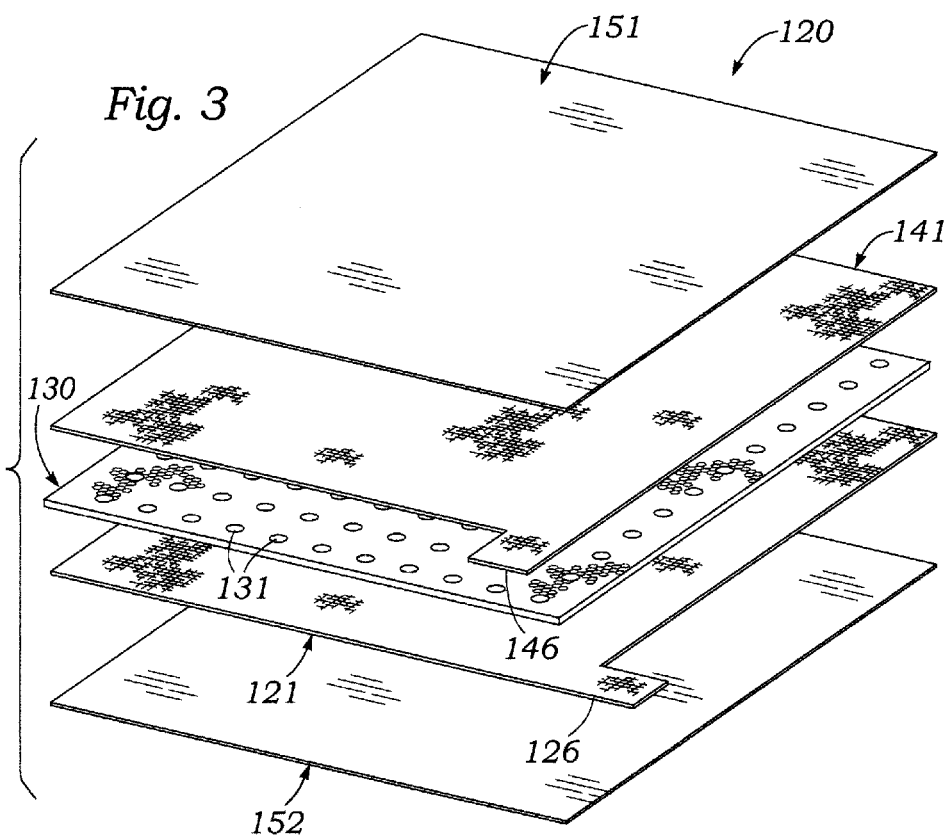
FIG. 3 is an exploded perspective view of a modification of the basic embodiment of a piezocapacitive sensor of FIGS. 1 and 2, in which a central foam dielectric pad thereof is perforated.
Figure 4:
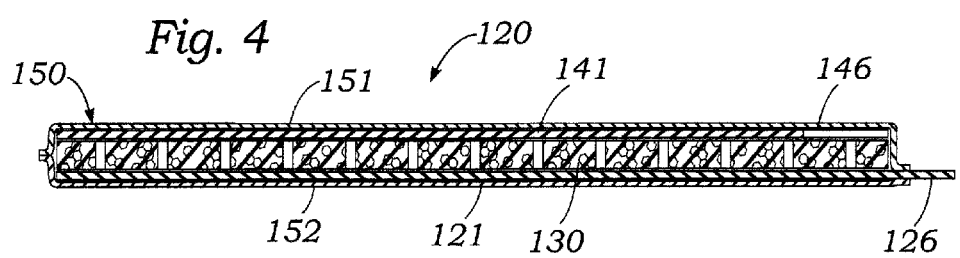
FIG. 4 is a vertical sectional view of the sensor of FIG. 3.

FIGS. 1 and 2 illustrate a basic embodiment of a piezocapacitive force sensor according to the present invention. FIGS. 3 and 4 illustrate a first modification of the embodiment of FIGS. 1 and 2, which has a perforated foam dielectric layer. FIGS. 5 and 6 illustrate a basic embodiment of a hybrid piezocapacitive-piezoresistive force sensor according to the present invention. FIGS. 7 and 8 illustrate a variation of the hybrid sensor of FIGS. 5 and 6, which has a single layer which is both piezocapacitive and piezoresistive.

Referring first to FIGS. 1 and 2, it may be seen that a basic embodiment 50 of a piezocapacitive force/pressure sensor according to the present invention includes a first, base, lower or inner flexible conductive sheet 51 which functions as the first conductive plate of a capacitor. Base conductive sheet 51 is preferably made of a thin, flexible, elasticity stretchable fabric which is electrically conductive. In an example embodiment of sensor 50, base conductive sheet consisted of a square piece 2 inches on a side of a woven electrical conductive fabric made of silver plated nylon threads, having a thickness of 0.4 mm, a weight per unit/area of 4.3 oz. per square yard, and a surface resistance of about 0.5 ohms per square. The foregoing fabric is available from LESS EMF corporation, 809 Madison Ave., Albany, N.Y. 12208 as catalog or part number A321.

As shown in FIG. 1, base conductor sheet 51 has a front laterally disposed edge 52, a parallel rear laterally disposed edge 53, and left and right parallel fore-and-aft disposed edges 54, 55.

Referring to FIGS. 1 and 2, it may be seen that base conductor sheet 51 has an integral rectangular-shaped conductive fabric connector tab 56 which is coplanar with and protrudes perpendicularly outwards from a corner part of the square conductor sheet. Thus, as shown in FIG. 1, base connector tab 56 has a front laterally disposed edge 57 which is a collinear extension of front edge 52 of base conductor sheet 51, an outer fore-and-aft disposed edge 58 parallel to and offset laterally to the right of right-hand edge 55 of the base conductor sheet 51, and a laterally inwardly extending rear edge 59 which is parallel to front edge 57.

Referring to FIGS. 1 and 2, it may be seen that sensor 50 includes a dielectric pad or core 60 which is supported on the upper surface 61 of base conductor sheet 51. As shown in the figures, dielectric pad 60 preferably has approximately the same outline shape and size, e.g., a 2 inch square, as base conductor sheet 51, so that the dielectric pad seats congruently of the base conductor sheet. In an example embodiment of sensor 50, dielectric pad 60 consisted of 2-inch square piece of polyurethane open-cell foam having a thickness of about 0.025 inch. The dielectric pad 60 was cut from a piece of open cell polyurethane foam having a density of about 28.52 kg/cubic meter, obtained from Burnett and Company, Foam Division, 2112 Montevideo Road, Jussea, Md. 20794, stock number S8ZJJ. The dielectric pad 60 had a dielectric constant or relative permittivity of about 4.

Referring to FIG. 1, it may be seen that piezocapacitive sensor 50 has an upper or outer flexible conductive sheet 71 which functions as the second or outer conductor plate of a capacitor. Outer flexible conductive sheet 71 may and preferably is substantially identical in construction to base conductive sheet 51. However, as shown in FIG. 1, upper or outer flexible conductive sheet 71 is preferably flipped over and rotated 90 degrees relative to base conductive sheet, so that a connector tab 76 of the upper conductive sheet extends forward from the front edge of sensor 50, so that it does not overly the rightwardly extending connector tab 56 of base conductive sheet 51.

As shown in FIGS. 1 and 2, upper or outer conductive sheet 71 has a lower flat surface 77 which contacts upper flat surface 78 of dielectric pad 60, and dielectric pad 60 has a lower surface 79 which contacts upper surface 61 of base conductive sheet. As shown in FIG. 2, the sandwiched relationship between base conductive sheet 51, dielectric pad 60, and outer conductive sheet 71 is preferably maintained by restraining the foregoing three elements against relative movement by encapsulating them in a flat flexible envelope 80.

Thus, as shown in FIGS. 1 and 2, encapsulating envelope 80 includes upper and lower flexible liquid impervious polyurethane cover sheets 81, 82 made of 2-mil thick polyurethane film. Upper and lower encapsulating polyurethane sheets 81, 82 preferably have a square shape, and are slightly larger than upper conductive sheet 71, dielectric pad 60 and base conductive sheet 51. This size relationship enables front, rear, left and right outer peripheral edges 91, 92, 93, 94 of upper encapsulating cover sheet 81 to be sealingly joined by adhesive, ultrasonic bonding, or other suitable techniques to corresponding outer peripheral edges 101, 102, 103, 104 of lower encapsulating cover sheet 82.

Figure 9:
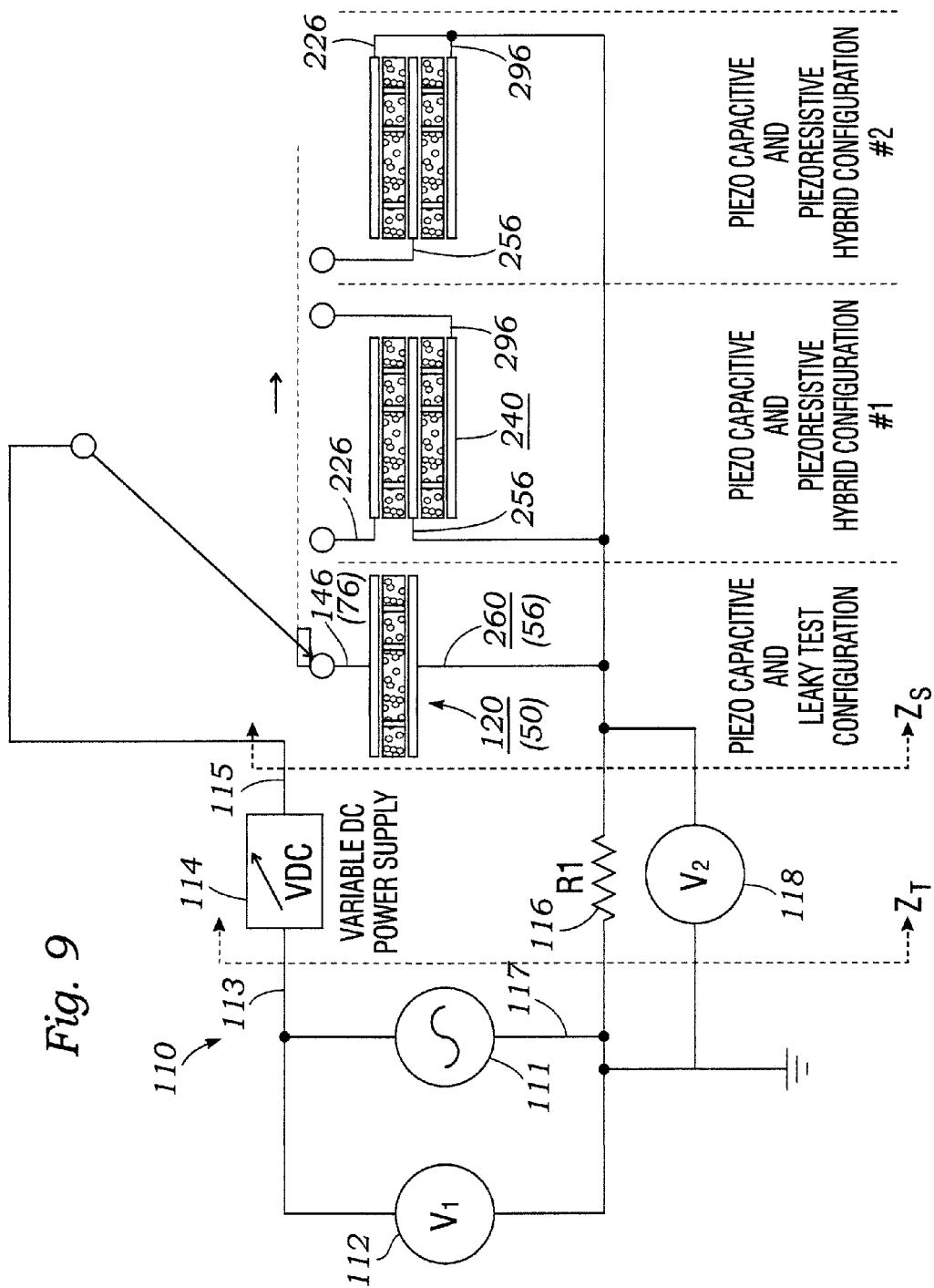
FIG. 9 is a schematic diagram of an apparatus according to the present invention useable both for determining transfer functions of the sensors shown in FIGS. 1-8, and for measuring forces exerted on the sensors.

FIG. 9 is a schematic diagram of a novel pressure measurement apparatus according to the present invention, showing how the sensor of FIGS. 1 and 2 may be connected to test circuitry to measure capacitance, conductance or admittance versus external normal force or pressure exerted on the sensor from which measurements the transfer function of the sensor may be plotted. The apparatus is also useable to measure forces or pressures exerted on sensors for which the impedance-versus-force transfer function has been previously determined.

As shown in FIG. 9, apparatus 110 includes a selectable frequency signal generator 111 which outputs a sinusoidal current that is adjustable to a selectable voltage V1, measured by a voltmeter 112. Signal generator 111 has connected in series with output terminal 113 thereof a variable voltage d.c. power supply 114 which outputs a voltage selectable between zero and a predetermined maximum value. The output terminal 115 of d.c. power supply 114 is connected to one terminal, e.g., upper connector tab 76 of a capacitive sensor 50. The opposite terminal, e.g. lower connector tab 56 of the sensor 50 is connected through a current sampling resistor 116 to the lower or ground output terminal 117 of signal generator 111.

Current flowing through sensor 50 in response to a d.c. voltage a.c. voltage, or combination of both a.c. and d.c. voltages applied to terminals 76-56 of the sensor, is measured by measuring the voltage drop V2 across resistor 116 using a voltmeter 118. Thus the d.c. conductance of sensor 50 may be measured by applying a d.c. voltage or low-frequency A.C. signal to the sensor. The a.c. conductance or susceptance, which is proportional to capacitance, may be measured by applying a higher frequency test voltage to the terminals of sensor 50, or, alternatively, by substituting a capacitance meter or bridge for the signal generator 111.

Table 1A lists values of capacitance measured by a capacitance meter of the sensor 50 shown in FIGS. 1 and 2, as a function of increasing applied pressure.

FIG. 10A is a graph showing the variation of capacitance measured by a capacitance meter of the sensor 50 shown in FIGS. 1 and 2, as a function of increasing applied pressure.

Table 1B lists values of voltage ratios $V_2/V_1$, which are proportional to susceptance and hence capacitance, for increasing and decreasing values of normal force or pressure applied to the sensor shown in FIGS. 1 and 2 and described above, as measured by test circuitry 110 shown in FIG. 9.

Referring to FIG. 9, the total impedance seen by signal generator 111 is:

$$Z_t = \sqrt{R_1^2 + Z_s^2}$$

where $$Z_s = \sqrt{R_s^2 + X_s^2}$$

and $R_s$ is the resistive component of sensor impedance $Z_s$, and $X_s$ is the capacitive reactive component of sensor impedance $Z_s$ i.e., $$X_s = 1/2\pi f C_s$$

where f is the signal generator frequency and $C_s$ is the capacitance of the sensor.

The current $I_s$ through sampling resistor $R_1$ and sensor 50 is:

$$I_s = V_1/Z_t,$$

and for $R_1$ selected to be much smaller than $Z_s$, $$I_s = V_1/Z_s.$$

For the capacitance component of sensor impedance, $Z_s$, $I_s = V_1 \times (B_s)$, where $B_s$ is the susceptance of the capacitive component of the sensor, $$Bs = 2\pi f C_s.$$

For the resistive component of sensor impedance $Z_s$, $$I_s = V_1 G_s,$$

where $G_s$ is the d.c. conductance of the sensor.

Referring to FIG. 9, $$V_2 = I_s R_1 = V_1 2\pi f C_s R_1$$

for the capacitance component of a sensor, and $$V_2 = I_s R_1 = V_1 G_s R_1$$

for the resistive component. Thus, the capacitance of a sensor may be calculated from the equation:

$$C_s = (V_2/V_1)(2\pi f R_1),$$

or $$Cs = k_1(V_2/V_1);$$

for f=30 KHz and R=1000 ohm, $k_1=5.305\times10^{-9}$ farads=5.305 nanofarads, and for $V_1=9$ volts, $C_s = k_C \times V_2 = 0.5895$ nf/volt. For the resistance component of sensor, $G_s = V_2/V_1 R_1$, $R_1=1,000$ ohms, $V_1=9$ volts; $G_s = k_g (V_2) = 0.1111$ millimhos/volt.

FIG. 10B is a graph which plots the voltage ratios of Table 1 versus external pressure, and thus is a graphical representation of the transfer function of the sensor 50 of FIGS. 1 and 2.

TABLE 1A

CAPACITANCE VS. PRESSURE OF EXAMPLE 1 (FIGS. 1 and 2)

| Pressure, Psi | Capacitance, nf |
|---|---|
| 0 | 0 |
| 0.66 | 0.57 |
| 1.29 | 0.58 |
| 2.66 | 0.6 |
| 7.33 | 0.625 |

TABLE 1B

SUSCEPTANCE VS. PRESSURE OF EXAMPLE 1 (FIGS. 1 & 2)
Source voltage 9 V @ 30 KHz, V2 measured across a 1K ohm series resistor

| Load, psi | V2, Volts Up | V2, Volts Down |
|---|---|---|
| 0.008 | 0.125 | 0.14 |
| 0.018 | 0.13 | 0.16 |
| 0.028 | 0.14 | 0.17 |
| 0.038 | 0.15 | 0.19 |
| 0.08 | 0.18 | 0.23 |
| 0.28 | 0.28 | 0.3 |
| 0.48 | 0.32 | 0.33 |
| 0.68 | 0.34 | 0.345 |
| 0.88 | 0.35 | 0.355 |
| 1.2 | 0.36 | 0.36 |
| 1.36 | 0.365 | 0.365 |

Example 2

Perforated Pad

FIGS. 3 and 4 illustrate a modification 120 of the sensor 50 shown in FIGS. 1 and 2. Modified sensor 120 is substantially similar in construction and function to sensor 50, with the primary difference being that the central dielectric pad 130 of sensor 120 contains perforations. In an example embodiment of sensor 120, central dielectric pad 130 had over its full area an array of circular holes 131 through the thickness dimension of the pad. Each hole had a diameter of ½ inch and was spaced apart by ¼ inch from adjacent holes. The holes 131 occupied about 50 percent of the surface area of the pads.

FIG. 11A is a plot of capacitance versus applied pressure for sensor 120 shown in FIGS. 3 and 4.

Table 2A lists values of capacitance measured by a capacitance meter of the sensor 120 shown in FIGS. 3 and 4 as a function of increasing applied pressure.

TABLE 2A

CAPACITANCE VS PRESSURE OF EXAMPLE 2 (FIGS. 3 & 4)

| Pressure, psi | Capacitance, nf |
|---|---|
| 0 | 0 |
| 0.166 | 0.2 |
| 0.833 | 1.75 |
| 1.33 | 4 |
| 2.1 | 8 |

Table 2B and FIG. 11B show the variation of voltage ratios $V_2/V_1$ proportional to capacitance of sensor 120 as a function of increasing (up) and decreasing (down) external pressure exerted on the sensor, i.e., the tabulated and graphical representations of the transfer function of the sensor.

TABLE 2B

SUSCEPTANCE VS. PRESSURE OF EXAMPLE 2 (FIGS. 3 & 4)
Source Voltage 9 V @ 30 KHz,
V2 measured across a 1K ohm series resistor

| Load, psi | V2, Volts (Up) | V2, Volts (Down) |
|---|---|---|
| 0 | 0.07 | 0.064 |
| 0.008 | \0.13 | 0.118 |
| 0.018 | 0.15 | 0.136 |
| 0.028 | 0.165 | 0.15 |
| 0.038 | 0.18 | 0.164 |
| 0.06 | 0.215 | 0.195 |
| 0.236 | 0.375 | 0.341 |
| 0.412 | 0.48 | 0.48 |
| 0.588 | 0.53 | 0.53 |
| 0.764 | 0.55 | 0.55 |
| 0.962 | 0.58 | 0.58 |

Example 3

Perforated Pad Saturated with Glycerine

FIG. 12A and table 3 show the variation of capacitance versus external force or pressure for a first variation 120A of the sensor 120 (Example 3) of FIGS. 3 and 4, in which the central perforated dielectric pad 130 thereof had a weight of about 1 gram and was saturated with 2 grams of glycerin.

TABLE 3

CAPACITANCE VS PRESSURE OF EXAMPLE 3 (FIGS. 3 & 4)

| Pressure, psi | Capacitance, nf |
|---|---|
| 0 | 6 |
| 0.166 | 8 |
| 0.833 | 14 |
| 1.33 | 6.25 |
| 2.1 | 18 |

Example 4

Perforated Pad Saturated with Glycerine Doped with Iodine

FIG. 13A and table 4 show the variation of capacitance versus external force or pressure for a second variation 120B of sensor 120 (Example 4) shown in FIGS. 3 and 4, in which the central perforated dielectric pad 130 thereof was saturated with 1 gram of glycerine doped with 1 gram of a 2.5% solution of iodine in isopropyl alcohol.

TABLE 4

CAPACITANCE VS PRESSURE OF EXAMPLE 4 (FIGS. 3 & 4)

| Pressure, psi | Capacitance, nf |
|---|---|
| 0 | 9 |
| 0.166 | 16.25 |
| 0.833 | 22 |
| 1.33 | 30 |
| 2.1 | 44 |

Example 5

Hybrid Piezocapacitive/Piezoresistive

FIGS. 5 and 6 illustrate a basic embodiment of a hybrid or composite piezocapacitive-piezoresistive force/pressure sensor 240 according the present invention, which has separate pressure sensing layers.

As shown in FIGS. 5 and 6, hybrid or composite piezocapacitive-piezoresistive sensor 240 includes a first pressure sensing layer consisting of a piezocapacitive section 250 which is substantially identical in construction and function to the modified sensor 120 shown in FIGS. 3 and 4. Preferably, piezocapacitance section 250 is similar to the first variation 120A of sensor 120 described above in which a central perforated foam dielectric pad 260 thereof is saturated with 2 grams of glycerin.

Referring to FIGS. 5 and 6, it may be seen that hybrid sensor 240 includes a second pressure sensing layer consisting of a piezoresistive section 280 which is positioned below piezocapacitive sensor section 250. However, the location of piezoresistive section 280 relative to piezocapacitive section 250 is not critical, and may optionally be positioned above the piezocapacitive section.

As shown in FIGS. 5 and 6, piezoresistive section 280 of hybrid sensor 240 has a laminated construction which is similar to that of piezocapacitive section 250. Thus, piezoresistive section 280 has a lower, or base conductive sheet 291 which consists of a thin, square sheet of conductive stretchy fabric which is substantially identical to upper conductive sheet 71 of sensor 50, and upper conductive sheet 271 of piezocapacitive section 250 of hybrid sensor 240. Piezoresistive section 280 includes an upper conductive sheet 311 which is substantially identical to lower, base conductive sheet 251 of piezocapacitive sensor 250. Preferably, upper conductive sheet 311 of piezoresistive section 280 and lower or base conductive sheet 251 of piezocapacitive section 250 comprise a single element 251-311.

Referring still to FIGS. 5 and 6, it may be seen that piezoresistive section 290 of hybrid sensor 240 includes a piezoresistive pad or core 390 which is supported on the upper surface 301 of base conductor sheet 291. As shown in the figures, piezoresistive pad 390 preferably has the same outline shape and size, e.g., a 2-inch square, as base conductor sheet 291. In an example embodiment of sensor 240, piezoresistive pad 390 consisted of a 2-inch square piece of type S8ZJJ polyurethane foam having a thickness of about 0.025 inch. The pad 390 was cut from a piece of unperforated foam which was impregnated with 2 grams of carbon lamp black having a particle size range of about 20 nm to about 40 nm.

Table 5 and FIG. 14 show the variation of voltage ratios $V_2/V_1$ measured at 30 KHZ, proportional to admittance and hence capacitance, for increasing and decreasing pressure exerted on piezocapacitive section 150 of hybrid sensor 240, Example 5.

Table 6 and FIG. 15 show the variation of conductance measured at 10 KHZ versus external pressure exerted on the piezocapacitive section 250 and piezoresistive section 280 of hybrid sensor 240, Example 5, measured for increasing and decreasing pressures.

TABLE 5

CAPACITANCE VS. PRESSURE OF EXAMPLE 5 (FIGS. 5 & 6)
Admittance Measured @ 30 KHz

| Pressure, psi | V2, Up | V2, Down |
|---|---|---|
| 0.00 | 0.2 | 0.25 |
| 000 | 0.3 | 0.3 |
| 0.01 | 0.35 | 0.45 |
| 0.02 | 0.4 | 0.575 |
| 0.03 | 0.45 | 0.6 |
| 0.04 | 0.525 | 0.625 |
| 0.06 | 0.575 | 0.65 |
| 0.07 | 0.6 | 0.675 |
| 0.08 | 0.65 | 0.7 |
| 0.12 | 0.7 | 0.8 |
| 0.31 | 0.9 | 1.05 |
| 0.49 | 1.05 | 1.15 |
| 0.68 | 1.2 | 1.2 |

TABLE 6

CONDUCTANCE VS. PRESSURE OF EXAMPLE 5 (FIGS. 5 & 6)

| Pressure, Psi | V2, Up | V2, Down |
|---|---|---|
| 0.00 | 0 | 0 |
| 0.005 | 0.005 | 0.025 |
| 0.01 | 0.01 | 0.05 |
| 0.02 | 0.05 | 0.075 |
| 0.03 | 0.075 | 0.1 |
| 0.04 | 0.1 | 0.125 |
| 0.06 | 0.125 | 0.15 |
| 0.07 | 0.175 | 0.175 |
| 0.08 | 0.2 | 0.2 |
| 0.12 | 0.225 | 0.25 |
| 0.31 | 0.4 | 0.55 |
| 0.49 | 0.6 | 0.75 |
| 0.68 | 0.8 | 0.8 |

Example 6

Leaky Dielectric

FIGS. 7 and 8 illustrate another embodiment 350 of a hybrid force pressure sensor according to the present invention. The embodiment 350 shown in FIGS. 7 and 8 is structurally similar to the embodiment 120 shown in FIGS. 3 and 4 and described above. However, embodiment 350 utilizes in place of the foam dielectric pad 130 a "leaky dielectric" pad 360.

In an example embodiment 350 of a leaky dielectric piezocapacitive-piezoresistive pressure/force sensor according to the present invention, upper conductive sheet 341 and lower conductive sheet 321 were substantially identical to upper and lower conductive sheets 141, 121, respectively, of the embodiment 120 of a piezocapacitive sensor shown in FIGS. 3 and 4 and described above. The central dielectric pad 360 of sensor had a composition and construction similar to that of un-perforated open-cell dielectric pad 60 of example 1 made of polyurethane foam shown in FIGS. 1 and 2. However, central dielectric pad 360 was treated to give it a piezoresistive characteristic in addition to a piezocapacitive characteristic by thoroughly mixing carbon black particles, of the type described above for example 5, with glycerin, and kneading the mixture of glycerin and carbon black particles into the foam pad.

Table 7 and FIG. 16 show the variation of capacitance of leaky dielectric sensor 350 as a function of external pressure exerted on the sensor, measured at a relatively high frequency of 30 KHz and thus displaying the capacitive part of the sensor transfer function Table 8 and FIG. 17 show the variation of conductance of leaky dielectric sensor 350 as a function of external pressure exerted on the sensor, measured at a relatively low frequency of 3 Hz and thus displaying the resistive part of the sensor transfer function.

Table 9 and FIG. 18 show the variation of both capacitance and conductance of the leaky dielectric sensor 350 as a function of external pressure exerted on the sensor.

Table 10 and FIG. 19 show the variation of the product of susceptance and conductance versus pressure transfer functions of the leaky dielectric sensor 350 as a function of external pressure exerted on the sensor. As may be seen by comparing FIG. 19 to FIG. 18, the product transfer function is substantially more linear and has substantially less hysterisis than either of the individual conductance or susceptance transfer functions.

TABLE 7

EXAMPLE 6 (FIGS. 7 & 8) SUSCEPTANCE MEASURED @ 30 KHz Source Voltage 9 V @ 30 KHz, V2 measured across a 1K ohm reference resistor

| Pressure, psi | $V_2$, Up | $V_2$, Down |
|---|---|---|
| 0.00 | 0.1 | 0.1 |
| 0.005 | 0.105 | 0.105 |
| 0.01 | 0.11 | 0.11 |
| 0.02 | 0.12 | 0.12 |
| 0.03 | 0.125 | 0.125 |
| 0.04 | 0.15 | 0.14 |
| 0.06 | 0.16 | 0.15 |
| 0.07 | 0.165 | 0.17 |
| 0.08 | 0.17 | 0.175 |
| 0.12 | 0.175 | 0.2 |
| 0.31 | 0.25 | 0.35 |
| 0.49 | 0.325 | 0.45 |
| 0.68 | 0.4 | 0.525 |
| 0.87 | 0.475 | 0.6 |
| 1.05 | 0.55 | 0.625 |

TABLE 8

CONDUCTANCE VS PRESSURE OF LEAKY DIELECTRIC SENSOR EXAMPLE 6 (FIGS. 7 & 8) MEASURED @ 3 Hz Source Voltage 9 V @ 3 Hz, V2 Measured Across A Series 1K ohm Resister

| Pressure, Psi | V2, Up | V2, Down |
|---|---|---|
| 0.00 | 0.000 | 0.000 |
| 0.005 | 0.000 | 0.000 |
| 0.01 | 0.053 | 0.053 |
| 0.02 | 0.084 | 0.105 |
| 0.03 | 0.105 | 0.126 |
| 0.04 | 0.116 | 0.158 |
| 0.06 | 0.158 | 0.211 |
| 0.07 | 0.189 | 0.211 |
| 0.08 | 0.211 | 0.211 |
| 0.12 | 0.316 | 0.316 |
| 0.31 | 0.526 | 0.632 |
| 0.49 | 0.789 | 0.947 |
| 0.68 | 0.947 | 1.158 |
| 0.87 | 1.158 | 1.368 |
| 1.05 | 1.368 | 1.579 |
| 1.28 | 1.684 | 1.684 |

TABLE 9

SUSCEPTANCE AND CONDUCTANCE OF LEAKY DIELECTRIC SENSOR EXAMPLE 6 (FIGS. 7 & 8)

| | Susceptance | | Conductance | |
|---|---|---|---|---|
| Pressure, Psi | V2, Up | V2, Down | V2, Up | V2, Down |
| 0.00 | 0.1 | 0.1 | 0.000 | 0.000 |
| 0.005 | 0.105 | 0.105 | 0.000 | 0.000 |
| 0.01 | 0.11 | 0.11 | 0.053 | 0.053 |
| 0.02 | 0.12 | 0.12 | 0.084 | 0.105 |
| 0.03 | 0.125 | 0.125 | 0.105 | 0.126 |
| 0.04 | 0.15 | 0.14 | 0.116 | 0.158 |
| 0.06 | 0.16 | 0.15 | 0.158 | 0.211 |
| 0.07 | 0.165 | 0.17 | 0.189 | 0.211 |
| 0.08 | 0.17 | 0.175 | 0.211 | 0.211 |
| 0.12 | 0.175 | 0.2 | 0.316 | 0.316 |
| 0.31 | 0.25 | 0.35 | 0.526 | 0.632 |
| 0.49 | 0.325 | 0.45 | 0.789 | 0.947 |
| 0.68 | 0.4 | 0.525 | 0.947 | 1.158 |
| 0.87 | 0.475 | 0.6 | 1.158 | 1.368 |
| 1.05 | 0.55 | 0.625 | 1.368 | 1.579 |
| 1.28 | 0.63 | 0.63 | 1.684 | 1.684 |

TABLE 10

SUSCEPTANCE TIMES CONDUCTANCE VS PRESSURE OF LEAKY DIELECTRIC SENSOR EXAMPLE 6 (FIGS. 7 & 8)

| Pressure, Psi | $V_2$ (Cap) × $V_2$ (Con) (Down) | $V_2$ (Cap) × $V_2$ (Con) (Up) |
|---|---|---|
| 0.00 | 0.000 | 0.000 |
| 0.005 | 0.000 | 0.000 |
| 0.01 | 0.006 | 0.006 |
| 0.02 | 0.010 | 0.010 |
| 0.03 | 0.013 | 0.013 |
| 0.04 | 0.017 | 0.016 |
| 0.06 | 0.025 | 0.024 |
| 0.07 | 0.031 | 0.032 |
| 0.08 | 0.036 | 0.037 |
| 0.12 | 0.055 | 0.063 |
| 0.31 | 0.132 | 0.184 |
| 0.49 | 0.257 | 0.355 |
| 0.68 | 0.379 | 0.497 |
| 0.87 | 0.550 | 0.695 |
| 1.05 | 0.753 | 0.855 |
| 1.28 | 1.061 | 1.061 |

Example 7

Modification of Example 5, Hybrid Sensor with Paralleled Sections

Table 11 and FIG. 20 show the variation of capacitance and conductance of a variation 240A of the sensor shown in FIGS. 5 and 6, in which the piezoresistive and piezocapacitive layers are electrically paralleled by connecting together their outer terminals 226, 296, as shown in hybrid configuration 2 of FIG.

9, to configure the sensor as a two terminal device, as a function of applied pressure for test frequencies of 30 KHz and 3 KHz.

TABLE 11

SUSCEPTANCE AND CONDUCTANCE OF HYBRID PARALLEL SENSOR EXAMPLE 7 (FIGS. 5 & 6)

| | Susceptance | | Conductance | |
|---|---|---|---|---|
| Pressure, psi | $V_2$, Up | $V_2$, Down | $V_2$, Up | $V_2$, Down |
| 0.00 | 0.2 | 0.25 | 0 | 0 |
| 0.005 | 0.3 | 0.3 | 0.005 | 0.025 |
| 0.01 | 0.35 | 0.45 | 0.01 | 0.05 |
| 0.02 | 0.4 | 0.575 | 0.05 | 0.075 |
| 0.03 | 0.45 | 0.6 | 0.075 | 0.1 |
| 0.04 | 0.525 | 0.625 | 0.1 | 0.125 |
| 0.06 | 0.575 | 0.65 | 0.125 | 0.15 |
| 0.07 | 0.6 | 0.675 | 0.175 | 0.175 |
| 0.08 | 0.65 | 0.7 | 0.2 | 0.2 |
| 0.12 | 0.7 | 0.8 | 0.225 | 0.25 |
| 0.31 | 0.9 | 1.05 | 0.4 | 0.55 |
| 0.49 | 1.05 | 1.15 | 0.6 | 0.75 |
| 0.68 | 1.2 | 1.2 | 0.8 | 08 |
| 0.87 | 0 | 0 | 0 | 0 |
| 1.05 | 0 | 0 | 0 | 0 |
| 1.28 | 0 | 0 | 0 | 0 |

Example 8

Modification of Example 8 with Series Resistance

Table 12 and FIG. 21 show the variation of capacitance and conductance with pressure for a modification 240B of the parallel two-terminal sensor configuration 240A, in which a 10,000 Ohm resister is inserted in series with the sensor. As may be seen by comparing FIG. 21 with FIG. 20, the voltage versus pressure transfer function with a 10,000 ohm series resistance is substantially more linear and has substantially less hypersis than the transfer function without a series resistance. Optionally a numerical value of a resistance such as 10,000 ohms may be inserted computationally in series in place of an actual resistance.

TABLE 12

CONDUCTANCE VS PRESSURE OF HYBRID SENSOR WITH 10K OHM RESISTER IN SERIES EXAMPLE 8 (FIGS. 5 & 6) Source Voltage 9 V @ 10 Hz, V2 Measured Across A 50 Ohm Reference Resistor

| Pressure, Psi | $V_2$, Up | $V_2$, Down |
|---|---|---|
| 0.008 | 0.0006 | 0.0006 |
| 0.0188 | 0.0010 | 0.0010 |
| 0.0288 | 0.0012 | 0.0014 |
| 0.0388 | 0.0015 | 0.0020 |
| 0.0488 | 0.0022 | 0.0025 |
| 0.0588 | 0.0024 | 0.0028 |
| 0.0688 | 0.0031 | 0.0035 |
| 0.1088 | 0.0043 | 0.0057 |
| 0.1488 | 0.0059 | 0.0081 |
| 0.1888 | 0.0077 | 0.0100 |
| 0.3488 | 0.0152 | 0.0164 |
| 0.6688 | 0.0222 | 0.0222 |

Example 9

Figure 22:
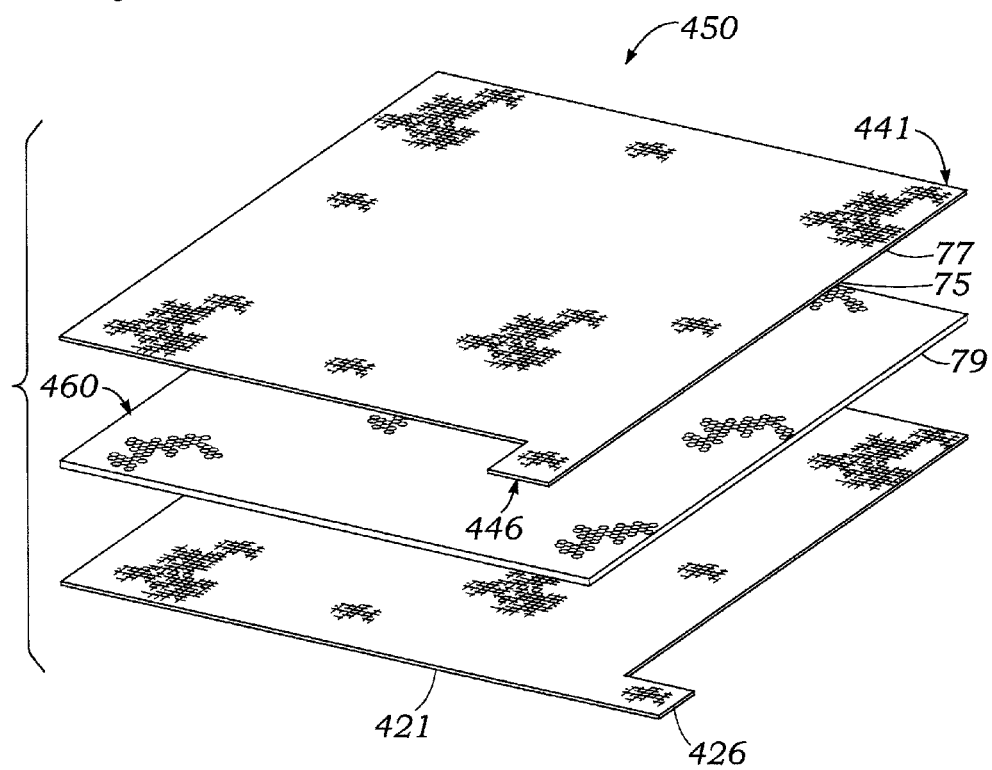
FIG. 22 is an exploded view of a simplified modification of the leaky dielectric sensor of FIG. 7.
Figure 23:
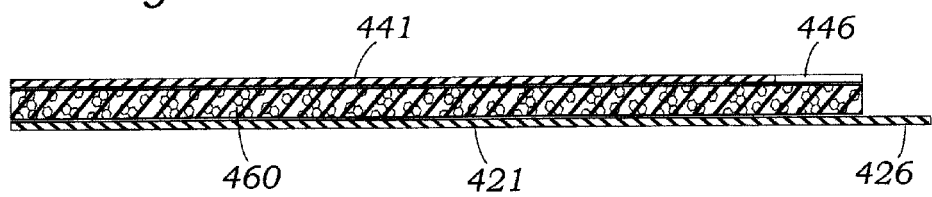
FIG. 23 is a vertical sectional view of the simplified leaky dielectric sensor of FIG. 22.

FIGS. 22 and 23 illustrate a simplified modification 450 of the leaky sensor 350 shown in FIGS. 7 and 8 and described above, in which the outer protective envelope is eliminated.

Table 13 shows the variation of capacitance and conductance of the simplified leaky sensor 450 as a function of increasing and decreasing pressures exerted on the sensor.

FIG. 24 is a graph showing the variation of capacitance of the simplified leaky sensor 450 as a function of increasing and decreasing pressures exerted on the sensor.

FIG. 25 is an expanded scale version of FIG. 24 showing capacitance versus pressure on sensor 450 for a smaller range of pressures FIG. 26 is a plot of conductance versus increasing and decreasing pressures on the simplified leaky sensor 450.

FIG. 27 is a plot of the product of conductance times capacitance versus increasing and decreasing pressures on the simplified leaky sensor 450.

TABLE 13

CONDUCTANCE AND SUSCEPTANCE OF SIMPLIFIED LEAKY DIELECTRIC SENSOR EXAMPLE 9 (FIGS. 22 & 23)

| | | | | | G x B | |
|---|---|---|---|---|---|---|
| Pressure, | Conductance (G) | | Susceptance (B) | | $V_2(s) \times V_2$ © | $V_2(s) \times V_2$ © |
| Psi | $V_2$, Up | $V_2$, Down | $V_2$, Up | $V_2$, Down | Up | Down |
| 0.00 | 0.1 | 0.1 | 0.1111 | 0.1111 | 0.01111 | 0.01111 |
| 0.005 | 0.105 | 0.105 | 0.1167 | 0.1167 | 0.012254 | 0.012254 |
| 0.01 | 0.11 | 0.11 | 0.1222 | 0.1222 | 0.013442 | 0.013442 |
| 0.02 | 0.12 | 0.12 | 0.1333 | 0.1333 | 0.015996 | 0.015996 |
| 0.03 | 0.125 | 0.125 | 0.1389 | 0.1389 | 0.017363 | 0.017363 |
| 0.04 | 0.15 | 0.14 | 0.1667 | 0.1556 | 0.025005 | 0.021784 |
| 0.06 | 0.16 | 0.15 | 0.1778 | 0.1667 | 0.028448 | 0.025005 |
| 0.07 | 0.165 | 0.17 | 0.1833 | 0.1889 | 0.030245 | 0.032113 |
| 0.08 | 0.17 | 0.175 | 0.1889 | 0.1944 | 0.032113 | 0.03402 |
| 0.12 | 0.175 | 0.2 | 0.1944 | 0.2222 | 0.03402 | 0.04444 |
| 0.31 | 0.25 | 0.35 | 0.2778 | 0.3889 | 0.06945 | 0.136115 |
| 0.49 | 0.325 | 0.45 | 0.3611 | 0.5000 | 0.117358 | 0.225 |
| 0.68 | 0.4 | 0.525 | 0.4444 | 0.5833 | 0.17776 | 0.306233 |
| 0.87 | 0.475 | 0.6 | 0.5278 | 0.6667 | 0.250705 | 0.40002 |
| 1.05 | 0.55 | 0.625 | 0.6111 | 0.6944 | 0.336105 | 0.434 |
| 1.28 | 0.63 | 0.63 | 0.7000 | 0.7000 | 0.441 | 0.441 |

What is claimed is:

1. A pressure sensitive sensor for producing an electrical output signal proportional to pressure exerted on said sensor, said sensor comprising;
   a. a first, electrically conductive base lamination which has an outer planar surface and an inner electrically conductive planar surface,
   b. a second, electrically conductive cover lamination which has an outer planar surface and an inner electrically conductive planar surface which confronts said inner conductive surface of said base lamination, and
   c. a pad positioned between said first and second laminations, said pad having a first outer surface in contact with said inner conductive surface of said base lamination and a second outer surface in contact with said inner surface of said cover lamination, said pad having an electrical property which is proportional to a force or pressure couple exerted normally on outer surfaces of said base lamination and said cover lamination sufficient to decrease spacing between said inner conductive surfaces of said first and second laminations.

2. A pressure sensor apparatus including the sensor of claim 1 and electrical impedance measurement circuitry for measuring the impedance of said sensor.

3. The sensor of claim 1 wherein at least part of said pad is elastically deformable.

4. The sensor of claim 1 wherein said pad is further defined as comprising at least in part a polymer foam.

5. The sensor of claim 4 wherein said polymer foam is further defined as being an open-cell foam.

6. The sensor of claim 5 wherein said polymer foam is further defined as being a polyurethane foam.

7. The sensor of claim 1 wherein said pad is further defined as being a thin slab made of a polymer foam.

8. The sensor of claim 7 wherein said polymer foam is further defined as being an open-cell foam.

9. The sensor of claim 8 wherein at least some of the cells of said pad contain a dielectric fluid.

10. The sensor of claim 9 wherein said dielectric fluid has a larger dielectric constant than that of said foam.

11. The sensor of claim 10 wherein said dielectric fluid is further defined as being composed at least in part of glycerin.

12. The sensor of claim 10 wherein said dielectric fluid is further defined as containing in solution a substance which has a higher dielectric constant than a pure dielectric fluid.

13. The sensor of claim 12 wherein said substance is further defined as being at least partially ionized in said dielectric fluid.

14. The sensor of claim 13 wherein said substance is further defined as containing iodine.

15. The sensor of claim 9 wherein said dielectric fluid contains a piezoresistive substance.

16. The sensor of claim 8 wherein said pad contains a piezoresistive substance.

17. The sensor of claim 16 wherein said piezoresistive substance is comprised at least partially of carbon particles.

18. A pressure sensor apparatus including the sensor of claim 16 and electrical impedance measurement circuitry for measuring the impedance of said sensor at frequencies selectable from at least two different frequencies.

19. The pressure sensor apparatus of claim 18 further including an electrical resistance insertable between said sensor and said impedance measurement circuitry.

20. The pressure sensor apparatus of claim 18 further including a multiplier apparatus for forming a product of sensor impedance measurements made at different frequencies.

21. The sensor of claim 1 wherein each of said base and cover laminations is composed at least in part of thin, flexible sheets of electrically conductive fabric.

22. The sensor of claim 21 wherein said electrically conductive fabric includes threads which are plated with a conductive substance.

23. The sensor of claim 21 wherein said electrical conductive fabric includes silver plated nylon threads.

24. A pressure sensor including a piezocapacitive section which has an electrical capacitance that varies in proportion to pressure on said piezocapacitive section, said piezocapacitive section including;
   a. a first, electrically conductive piezocapacitive section base lamination which has an outer planar surface and an inner electrically conductive planar surface,
   b. a second, electrically conductive piezocapacitive section cover lamination which has an outer planar surface and an inner electrically conductive planar surface that confronts said inner conductive surface of said piezocapacitive section base lamination, and
   c. an elastically deformable dielectric pad having a first outer surface in contact with said inner conductive surface of said piezocapacitive section base lamination and a second outer surface in contact with said inner surface of said piezocapacitive section cover lamination, said pad having an electrical capacitance which is proportional to a force or pressure couple exerted normally on outer surfaces of said piezocapacitive section base lamination and said piezocapacitive section cover lamination sufficient to decrease the thickness of said pad.

25. The sensor of claim 24 wherein said pad is further defined as including a thin slab made of an open-cell polymer foam.

26. The sensor of claim 25 wherein at least some of the cells of said pad contain a dielectric fluid.

27. The sensor of claim 26 wherein said dielectric fluid contains in solution a substance which gives said dielectric fluid a higher dielectric constant than a pure dielectric fluid.

28. The sensor of claim 27 wherein said substance is further defined as being at least partially ionized in said dielectric fluid.

29. The sensor of claim 24 further including a piezoresistive section which has an electrical conductance which varies in proportion to pressure on said piezoresistive section, said piezoresistive section including;
   a. a first electrically conductive piezoresistive section base lamination which has an outer planar surface and an inner electrically conductive planar surface,
   b. a second, electrically conductive piezoresistive section cover lamination which has an outer planar surface and an inner electrically conductive planar surface that confronts said inner conductive surface of said piezoresistive section base lamination,
   c. an elastically deformable piezoresistive pad having a first outer surface in contact with an inner conductive surface of said piezoresistive section base lamination and a second outer surface in contact with said inner surface of said piezoresistive section cover lamination, said piezoresistive pad having an electrical conductance which is proportional to a force or pressure couple exerted normally on outer surfaces of said piezoresistive section base lamination and said piezoresistive section cover lamination sufficient to decrease the thickness of said piezoresistive pad, and
   d. said piezoresistive section being stacked with said piezocapacitive section with an outer surface of a piezoresistive section lamination in planar contact with an outer surface of a piezocapacitive section lamination.

30. The sensor of claim 29 wherein a said piezoresistive lamination and a said piezocapacitive lamination are coextensive.

31. The sensor of claim 29 wherein said piezocapacitive base lamination and said piezoresistive section base lamination are coextensive in a common lamination.

32. The sensor of claim 31 further including an intermediate lead-out conductor strip in electrically conductive contact with said common lamination.

33. The sensor of claim 32 further including a first outer lead-out conductor strip in electrically conductive contact with said piezocapacitive section cover lamination and a second lead-out conductor strip in electrically conductive contact with said piezoresistive section cover lamination.

34. A pressure sensor apparatus including the sensor of claim 24 and electrical impedance measurement circuitry for measuring the impedance of said sensor at frequencies selectable from at least two different frequencies.

35. The pressure sensor apparatus of claim 34 further including an electrical resistance insertable between at least one of said piezocapacitive and said piezoresistive sections of said sensor and said impedance measurement circuitry.

36. The pressure sensor apparatus of claim 34 further including a multiplier apparatus for forming a product of sensor impedance measurements made at different frequencies.

* * * * *